United States Patent [19]
Okuno et al.

[11] Patent Number: 5,903,129
[45] Date of Patent: May 11, 1999

[54] METHOD AND APPARATUS FOR SENSOR-LESS CONTROL OF PERMANENT MAGNET SYNCHRONOUS MOTOR

[75] Inventors: Tomoya Okuno, Okazaki; Hiroyuki Sakakibara, Hekinan; Hiroya Tsuji; Kazuyoshi Obayashi, both of Kariya, all of Japan

[73] Assignees: Denso Corporation, Kariya; Nippon Soken, Inc., Nishio, both of Japan

[21] Appl. No.: 08/856,588

[22] Filed: May 15, 1997

Related U.S. Application Data

[63] Continuation-in-part of application No. 08/599,132, Feb. 9, 1996, Pat. No. 5,726,549.

[30] Foreign Application Priority Data

| Feb. 10, 1995 | [JP] | Japan | 7-046361 |
| Nov. 24, 1995 | [JP] | Japan | 7-329732 |
| May 15, 1996 | [JP] | Japan | 8-146788 |
| Mar. 27, 1997 | [JP] | Japan | 9-094684 |

[51] Int. Cl.$^6$ .................................................. H02P 1/46
[52] U.S. Cl. ........................ 318/721; 318/722; 318/723; 318/724
[58] Field of Search .................... 318/798–821, 318/720–724

[56] References Cited

U.S. PATENT DOCUMENTS

| 5,057,759 | 10/1991 | Ueda et al. | 318/616 |
| 5,225,759 | 7/1993 | Endo et al. | 318/778 |
| 5,231,338 | 7/1993 | Bulgarelli et al. | 312/254 |
| 5,726,549 | 3/1998 | Okuno et al. | 318/271 |

FOREIGN PATENT DOCUMENTS

| 58-036188 | 3/1983 | Japan . |
| 62-055398 | 11/1987 | Japan . |
| 63-039490 | 2/1988 | Japan . |
| 63-129886 | 6/1988 | Japan . |
| 63-186588 | 8/1988 | Japan . |
| 1-234090 | 9/1989 | Japan . |
| 2-179277 | 7/1990 | Japan . |
| 2-211089 | 8/1990 | Japan . |
| 3-183394 | 8/1991 | Japan . |
| 4-251592 | 9/1992 | Japan . |
| 5-034918 | 5/1993 | Japan . |
| 6-014794 | 2/1994 | Japan . |
| 6-042795 | 6/1994 | Japan . |
| 7-123775 | 5/1995 | Japan . |

OTHER PUBLICATIONS

Watanabe, et al: A Sensorless Detecting Strategy of Rotor Position and Speed on Permanent Magnet Synchronous Motor, T. IEE Japan,. vol. 110–D, No. 11, 1990, pp. 1193–1200.

*Primary Examiner*—David Martin
*Attorney, Agent, or Firm*—Pillsbury Madison & Sutro LLP

[57] ABSTRACT

A permanent magnet synchronous motor having multiple-phase armature windings and a rotor is subjected to sensor-less control. Phase voltages are generated in response to voltage command values. The generated phase voltages are applied to the armature windings. Phase currents through the armature windings are detected. The detected phase currents depend on the voltage command values. An angular position and an angular velocity of the rotor are calculated from the detected phase currents. The voltage command values are adjusted in response to the calculated angular position and the calculated angular velocity of the rotor to implement feedback control of the motor. An angular velocity of the rotor is estimated from a time-domain variation in the calculated angular position of the rotor. A determination is made as to whether or not the calculated angular velocity of the rotor and the estimated angular velocity of the rotor are substantially equal to each other. The calculated angular position of the rotor is changed by a predetermined phase value and is thereby corrected when it is determined that the calculated angular velocity of the rotor and the estimated angular velocity of the rotor are not substantially equal to each other.

16 Claims, 17 Drawing Sheets

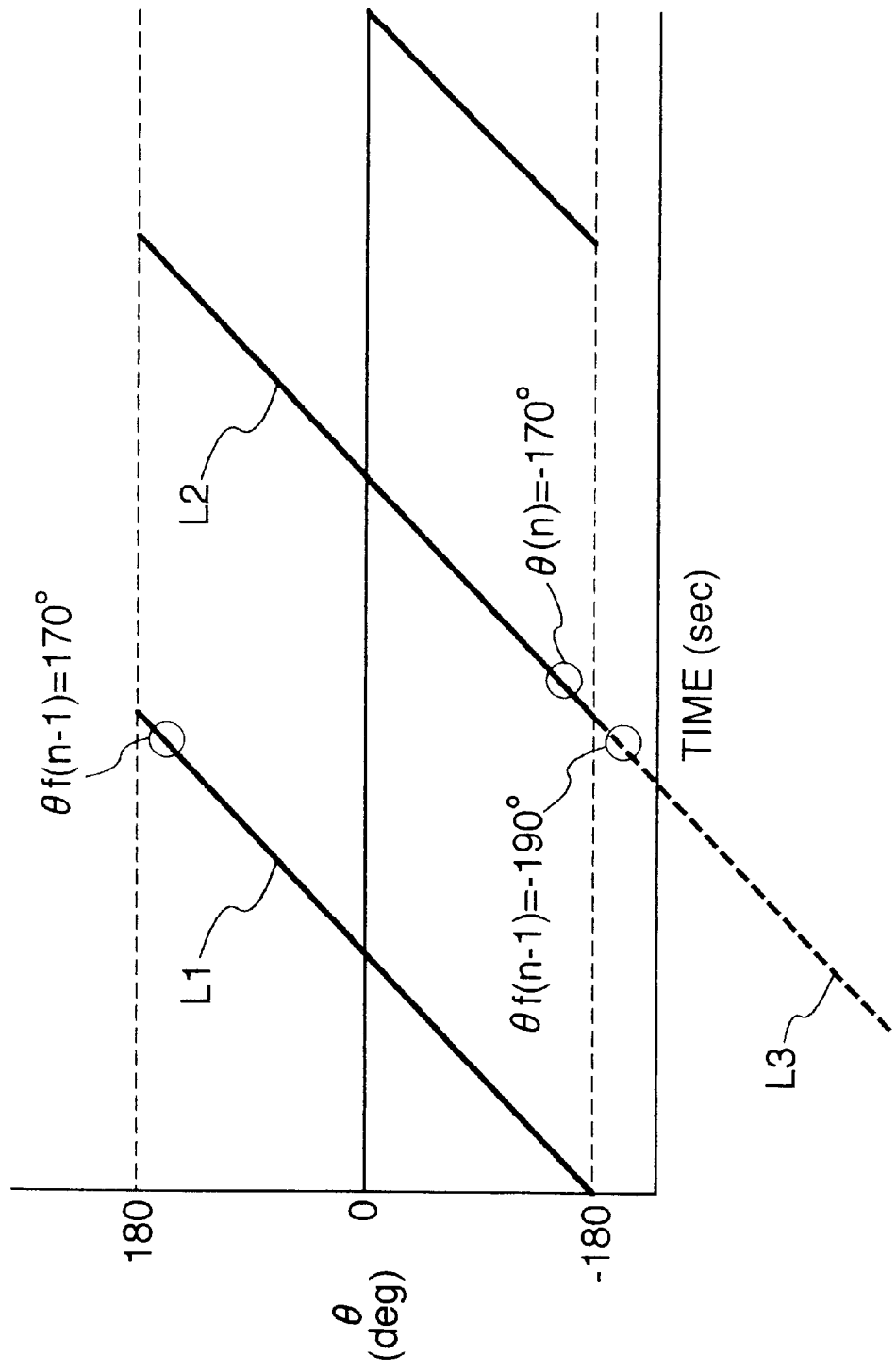

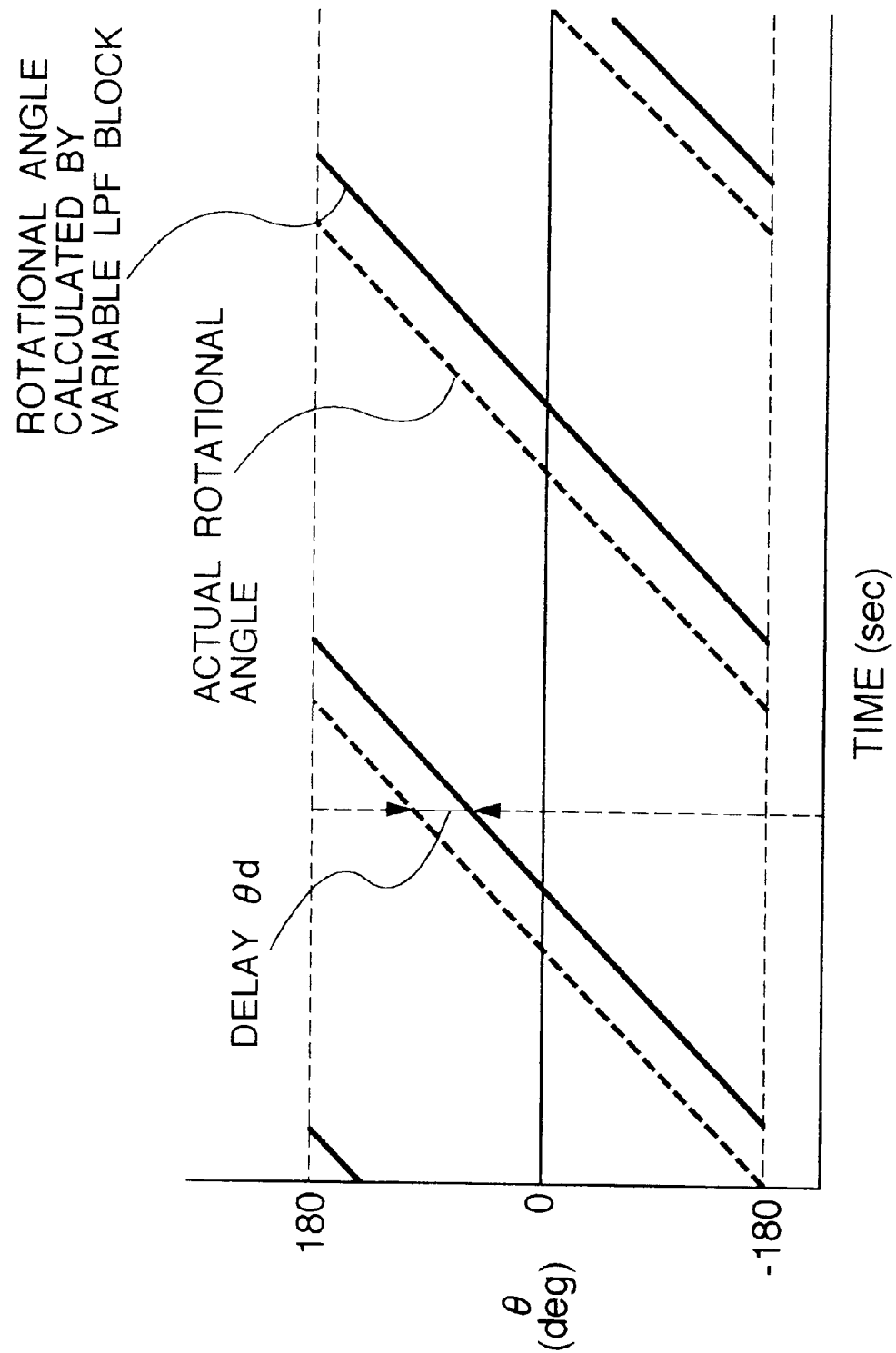

METHOD AND APPARATUS FOR SENSOR-LESS CONTROL OF PERMANENT MAGNET SYNCHRONOUS MOTOR

CROSS-REFERENCES TO RELATED APPLICATIONS

This is a continuation-in-part of U.S. patent application, Ser. No. 08/599,132, filed on Feb. 9, 1996 and now U.S. Pat. No. 5,726,549 issued on Mar. 10, 1998.

BACKGROUND OF THE INVENTION

1. Field of the Invention

This invention relates to a method and an apparatus for sensor-less control of a permanent magnet synchronous motor.

2. Description of the Related Art

It is known to control a permanent magnet synchronous motor without using any positional sensor. In one example of known sensor-less speed control, the rotor position and the speed of a permanent magnet synchronous motor are calculated from the instantaneous values of phase voltages and phase currents according to a given voltage equation corresponding to an equivalent circuit of the motor. Drive of the motor is adjusted in response to the calculated rotor position and the calculated speed.

Since the polarity of a magnetic field can not be determined by the above-indicated voltage equation, two different angular positions are present as the calculated rotor position. At start of the motor, the polarity of a magnetic field is examined, and an initial angular rotor position is determined on the basis of the examination result. Then, selection is given of one of two angular rotor positions which has continuity with the initial angular rotor position. Subsequently, selection is periodically given of one of two angular rotor positions which has continuity with the immediatelypreceding selected angular rotor position.

During low-speed drive of the motor, voltage command values are relatively small, and the difference between the voltage command values and phase voltages actually applied to the motor tends to be relatively great due to a dead time. Such a great difference causes a large error in the calculated angular rotor position. Accordingly, there is a chance that the polarity of a magnetic field will be erroneously recognized. In the erroneous recognition, the calculated angular rotor position differs from the actual angular rotor position by an error corresponding to about T radians.

In a typical example of known sensor-less speed control of a permanent magnet synchronous motor, an inverter generates phase currents in response to the output signal of a PWM (pulse width modulation) control circuit. The inverter feeds the generated phase currents to the motor. The phase currents and related phase voltages are monitored. A calculator estimates the rotor position in the motor from the monitored phase currents and the monitored phase voltages. The PWM control circuit is directly or indirectly informed of the estimated rotor position. The output signal of the PWM control circuit depends on the estimated rotor position. Accordingly, the phase currents fed to the motor are adjusted in response to the estimated rotor position.

SUMMARY OF THE INVENTION

It is a first object of this invention to provide an improved method of sensor-less control of a permanent magnet synchronous motor.

It is a second object of this invention to provide an improved apparatus for sensor-less control of a permanent magnet synchronous motor.

A first aspect of this invention provides a method of sensor-less control of a permanent magnet synchronous motor having multiple-phase armature windings and a rotor, the method comprising the steps of generating voltage command values; generating phase voltages in response to the generated voltage command values; applying the generated phase voltages to the armature windings; detecting phase currents through the armature windings, the detected phase currents depending on the voltage command values; calculating an angular position and an angular velocity of the rotor from the detected phase currents; adjusting the voltage command values in response to the calculated angular position and the calculated angular velocity of the rotor to implement feedback control of the motor; estimating an angular velocity of the rotor from a time-domain variation in the calculated angular position of the rotor; determining whether or not the calculated angular velocity of the rotor and the estimated angular velocity of the rotor are substantially equal to each other; and changing the calculated angular position of the rotor by a predetermined phase value to correct the calculated angular position of the rotor when it is determined that the calculated angular velocity of the rotor and the estimated angular velocity of the rotor are not substantially equal to each other.

A second aspect of this invention is based on the first aspect thereof, and provides a method wherein the determining step comprises detecting a first direction of rotation of the rotor from the calculated angular velocity of the rotor; detecting a second direction of rotation of the rotor from the estimated angular velocity of the rotor; deciding whether or not the first direction and the second direction are equal to each other; determining that the calculated angular velocity of the rotor and the estimated angular velocity of the rotor are substantially equal to each other when the first direction and the second direction are equal to each other; and determining that the calculated angular velocity of the rotor and the estimated angular velocity of the rotor are not substantially equal to each other when the first direction and the second direction are not equal to each other.

A third aspect of this invention is based on the first aspect thereof, and provides a method wherein the determining step comprises calculating a ratio between the calculated angular velocity of the rotor and the estimated angular velocity of the rotor; deciding whether or not the calculated ratio exceeds a predetermined ratio; determining that the calculated angular velocity of the rotor and the estimated angular velocity of the rotor are substantially equal to each other when the calculated ratio does not exceed the predetermined ratio; and determining that the calculated angular velocity of the rotor and the estimated angular velocity of the rotor are not substantially equal to each other when the calculated ratio exceeds the predetermined ratio.

A fourth aspect of this invention is based on the first aspect thereof, and provides a method wherein the predetermined phase value is equal to $\pi$ radians.

A fifth aspect of this invention is based on the first aspect thereof, and provides a method further comprising the step of inverting a sign of the calculated angular velocity of the rotor to correct the calculated angular velocity of the rotor when it is determined that the calculated angular velocity of the rotor and the estimated angular velocity of the rotor are not substantially equal to each other.

A sixth aspect of this invention is based on the first aspect thereof, and provides a method further comprising the step of updating the calculated angular velocity of the rotor in response to the correction-resultant calculated angular position of the rotor when it is determined that the calculated angular velocity of the rotor and the estimated angular velocity of the rotor are not substantially equal to each other.

A seventh aspect of this invention is based on the first aspect thereof, and provides a method further comprising the step of using the estimated angular velocity of the rotor instead of the calculated angular velocity of the rotor in adjusting the voltage command values when it is determined that the calculated angular velocity of the rotor and the estimated angular velocity of the rotor are not substantially equal to each other.

An eighth aspect of this invention provides a method of sensor-less control of a permanent magnet synchronous motor having multiple-phase armature windings and a rotor, the method comprising the steps of generating phase voltages; applying the generated phase voltages to the armature windings; detecting phase currents through the armature windings; calculating an angular position and an angular velocity of the rotor from the detected phase currents; adjusting the phase voltages in response to the calculated angular position and the calculated angular velocity of the rotor to implement feedback control of the motor; estimating an angular velocity of the rotor from a time-domain variation in the calculated angular position of the rotor; determining whether or not the calculated angular velocity of the rotor and the estimated angular velocity of the rotor are substantially equal to each other; and correcting the calculated angular position and the calculated angular velocity of the rotor when it is determined that the calculated angular velocity of the rotor and the estimated angular velocity of the rotor are not substantially equal to each other.

A ninth aspect of this invention provides an apparatus for sensor-less control of a permanent magnet synchronous motor having multiple-phase armature windings and a rotor, the apparatus comprising means for generating voltage command values; means for generating phase voltages in response to the generated voltage command values; means for applying the generated phase voltages to the armature windings; means for detecting phase currents through the armature windings, the detected phase currents depending on the voltage command values; means for calculating an angular position and an angular velocity of the rotor from the detected phase currents; means for adjusting the voltage command values in response to the calculated angular position and the calculated angular velocity of the rotor to implement feedback control of the motor; means for estimating an angular velocity of the rotor from a time-domain variation in the calculated angular position of the rotor; means for determining whether or not the calculated angular velocity of the rotor and the estimated angular velocity of the rotor are substantially equal to each other; and means for changing the calculated angular position of the rotor by a predetermined phase value to correct the calculated angular position of the rotor when it is determined that the calculated angular velocity of the rotor and the estimated angular velocity of the rotor are not substantially equal to each other.

A tenth aspect of this invention is based on the ninth aspect thereof, and provides an apparatus wherein the determining means comprises means for detecting a first direction of rotation of the rotor from the calculated angular velocity of the rotor; means for detecting a second direction of rotation of the rotor from the estimated angular velocity of the rotor; means for deciding whether or not the first direction and the second direction are equal to each other; means for determining that the calculated angular velocity of the rotor and the estimated angular velocity of the rotor are substantially equal to each other when the first direction and the second direction are equal to each other; and means for determining that the calculated angular velocity of the rotor and the estimated angular velocity of the rotor are not substantially equal to each other when the first direction and the second direction are not equal to each other.

An eleventh aspect of this invention is based on the ninth aspect thereof, and provides an apparatus wherein the determining means comprises means for calculating a ratio between the calculated angular velocity of the rotor and the estimated angular velocity of the rotor; means for deciding whether or not the calculated ratio exceeds a predetermined ratio; means for determining that the calculated angular velocity of the rotor and the estimated angular velocity of the rotor are substantially equal to each other when the calculated ratio does not exceed the predetermined ratio; and means for determining that the calculated angular velocity of the rotor and the estimated angular velocity of the rotor are not substantially equal to each other when the calculated ratio exceeds the predetermined ratio.

A twelfth aspect of this invention is based on the ninth aspect thereof, and provides an apparatus wherein the predetermined phase value is equal to $\pi$ radians.

A thirteenth aspect of this invention is based on the ninth aspect thereof, and provides an apparatus further comprising means for inverting a sign of the calculated angular velocity of the rotor to correct the calculated angular velocity of the rotor when it is determined that the calculated angular velocity of the rotor and the estimated angular velocity of the rotor are not substantially equal to each other.

A fourteenth aspect of this invention is based on the ninth aspect thereof, and provides an apparatus further comprising means for updating the calculated angular velocity of the rotor in response to the correction-resultant calculated angular position of the rotor when it is determined that the calculated angular velocity of the rotor and the estimated angular velocity of the rotor are not substantially equal to each other.

A fifteenth aspect of this invention is based on the ninth aspect thereof, and provides an apparatus further comprising means for using the estimated angular velocity of the rotor instead of the calculated angular velocity of the rotor in adjusting the voltage command values when it is determined that the calculated angular velocity of the rotor and the estimated angular velocity of the rotor are not substantially equal to each other.

A sixteenth aspect of this invention provides an apparatus for sensor-less control of a permanent magnet synchronous motor having multiple-phase armature windings and a rotor, the apparatus comprising means for generating phase voltages; means for applying the generated phase voltages to the armature windings; means for detecting phase currents through the armature windings; means for calculating an angular position and an angular velocity of the rotor from the detected phase currents; means for adjusting the phase voltages in response to the calculated angular position and the calculated angular velocity of the rotor to implement feedback control of the motor; means for estimating an angular velocity of the rotor from a time-domain variation in the calculated angular position of the rotor; means for determining whether or not the calculated angular velocity of the rotor and the estimated angular velocity of the rotor are substantially equal to each other; and means for correcting the calculated angular position and the calculated angular velocity of the rotor when it is determined that the calculated angular velocity of the rotor and the estimated angular velocity of the rotor are not substantially equal to each other.

BRIEF DESCRIPTION OF THE DRAWINGS

FIG. 4 is a time-domain diagram of a rotational angle of the rotor in a permanent magnet synchronous motor.

FIG. 12 is a time-domain diagram of an actual rotational angle and a calculated rotational angle of the rotor in a permanent magnet synchronous motor.

DESCRIPTION OF THE PREFERRED EMBODIMENTS

First Embodiment

Figure 1:
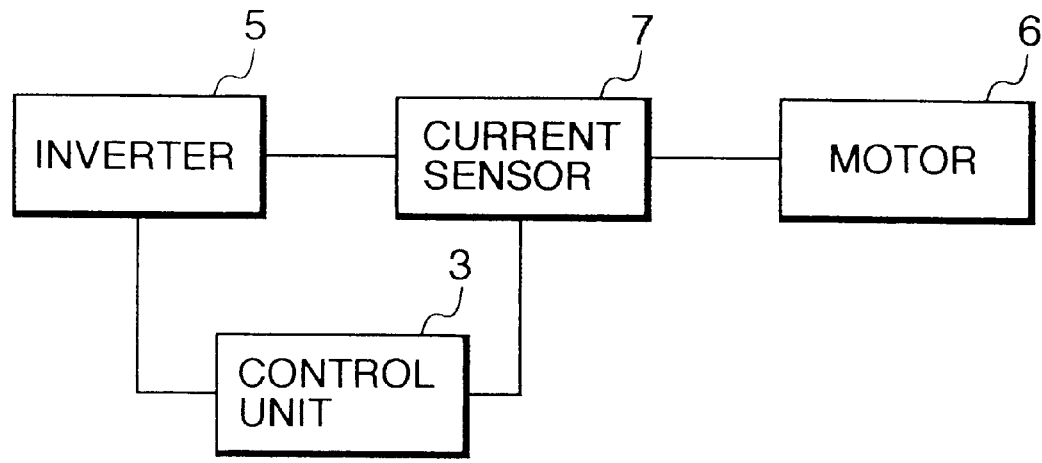
FIG. 1 is a block diagram of a sensor-less control apparatus for a permanent magnet synchronous motor according to a first embodiment of this invention.

With reference to FIG. 1, a control unit 3 receives a signal representative of a command torque (a target torque) from a suitable device (not shown). An inverter 5 feeds phase currents iU, iV, and iW to armature windings of a permanent magnet synchronous motor respectively. Therefore, the rotor in the motor 6 rotates in response to the phase currents iU, iV, and iW. Current sensors 7 associated with two of current feed lines between the inverter 5 and the motor 6 detect the phase currents iU and iW, and output signals representing the detected phase currents iU and iW. The control unit 3 receives the output signals of the current sensors 7.

The control unit 3 generates control signals in response to the command torque and the detected phase currents iU and iW. The control unit 3 outputs the control signals to the inverter 5. The inverter 5 generates the phase currents iU, iV, and iW in response to the output signals of the control unit 3.

The control unit 3 includes a DSP (a digital signal processor), a microcomputer, or a similar device which has a combination of an input/output port (an interface), a processing section, a ROM, and a RAM. The control unit 3 operates in accordance with a program stored in the ROM. The program is iteratively executed at a given short period so that control implemented by the control unit 3 recurs at the same period. The input/output port contains a timer interface capable of generating and outputting PWM (pulse width modulation) waveform signals, A/D converters for changing analog signals into corresponding digital signals, and D/A converters for changing digital signals into corresponding analog signals.

Figure 2:
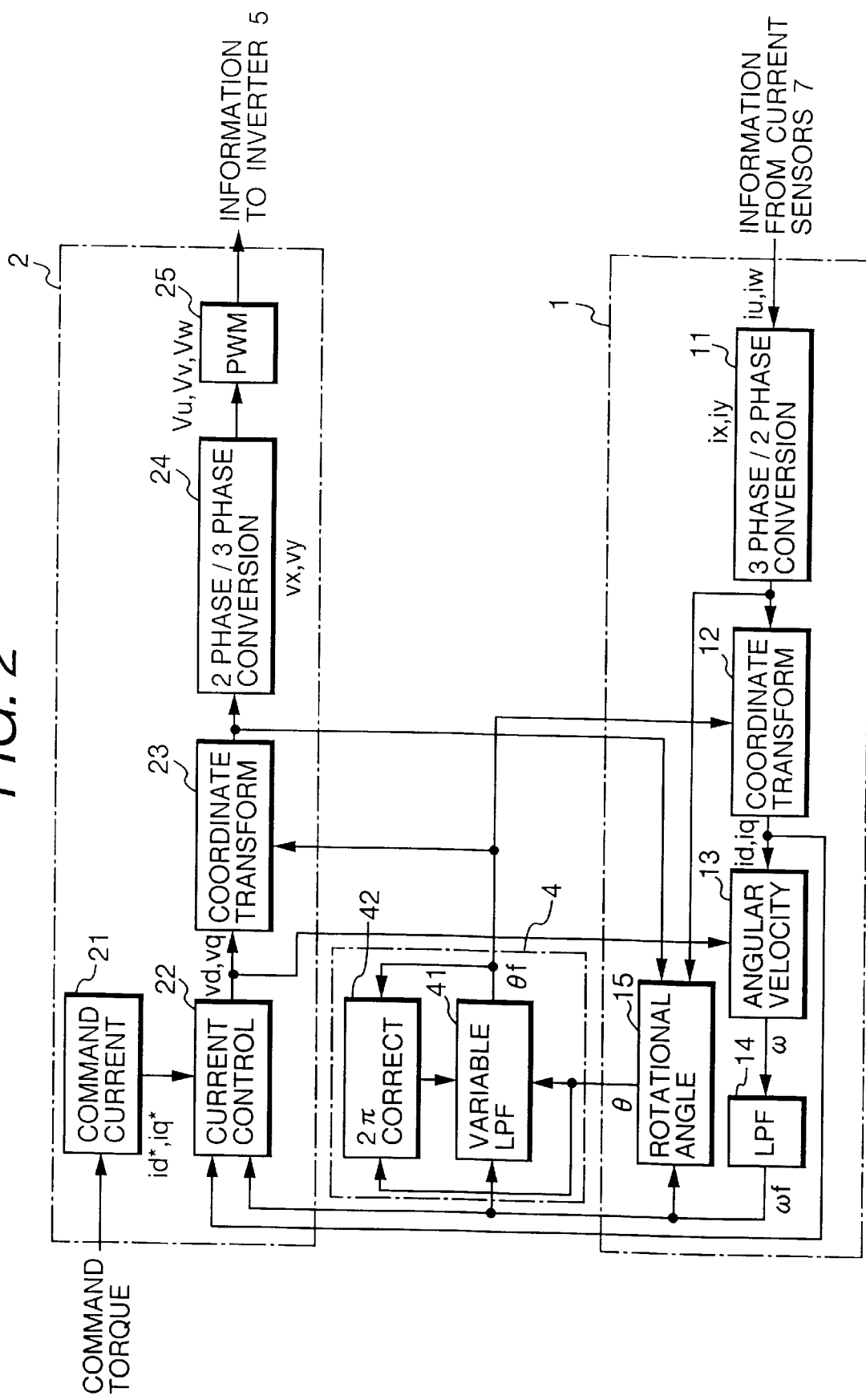
FIG. 2 is a diagram of the flow of operation of a control unit in FIG. 1.

FIG. 2 shows the flow of functions of the control unit 3. The functions of the control unit 3 are determined by software, that is, the previously-mentioned program. It should be noted that FIG. 2 does not show the hardware structure of the control unit 3.

With reference to FIG. 2, there are a calculating section 1, an energization controlling section 2, and a rotational angle correcting section 4. The calculating section 1 includes blocks 11, 12, 13, 14, and 15. The energization controlling section 2 includes blocks 21, 22, 23, 24, and 25. The blocks 11–15 and 21–25 in the calculating section 1 and the energization controlling section 2 can be provided by software in a DSP such as "TMS320C31" produced by Texas Instruments. The rotational angle correcting section 4 includes blocks 41 and 42.

With reference to FIGS. 1 and 2, the block 25 which is also referred to as the PWM block 25 generates energization signals in response to signals of command voltages (target voltages) VU, VV, and VW. The energization signals generated by the PWM block 25 are transmitted from the control unit 3 to the inverter 5. The inverter 5 generates three pulse currents (three phase currents iU, iV, and iW) in response to the energization signals, and feeds the generated pulse currents to the armature windings of the motor 6 respectively. Two phase currents iU and iW among the three phase currents are detected by the current sensors 7. The current sensors 7 generate signals representing the detected phase currents iU and iW. The current sensors 7 output the phase-current signals to the control unit 3.

Figure 3:
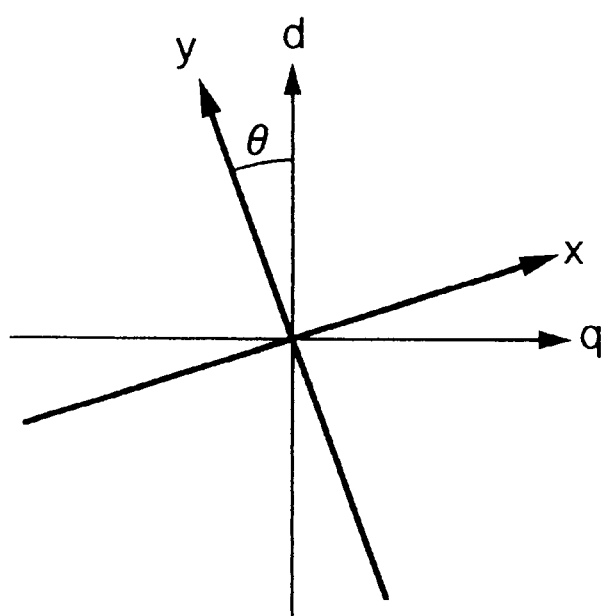
FIG. 3 is a diagram of the relation between different coordinate systems.

The block 11 which is also referred to as the 3-phase/2-phase conversion block 11 receives information of the detected phase currents iU and iW from the current sensors 7. The 3-phase/2-phase conversion block 11 calculates the other phase current iV from the phase currents iU and iW. The 3-phase/2-phase conversion block 11 changes the three phase currents iU, iV, and iW into two phase currents ix and iy defined in a given stationary orthogonal coordinate system x-y. As shown in FIG. 3, the orthogonal coordinate system x-y is angularly offset from a rotational orthogonal coordinate system d-q by an angle (a rotational angle) θ. The orthogonal coordinate system d-q moves together with the rotor in the motor 6.

The 3-phase/2-phase conversion block 11 informs the block 15 of the phase currents ix and iy. The block 15 is also referred to as the rotational angle calculation block 15. The block 15 is also informed of voltages Vy and Vx defined in the orthogonal coordinate system x-y. Furthermore, the block 15 is informed of an angular velocity ωf. The block 15 calculates a rotational angle θ from the phase currents ix and iy, the voltages Vy and Vx, and the angular velocity ωf by referring to the following equation.

$$\theta = \tan^{-1}\left\{\frac{Vy - (Rd + pLd)iy + \omega fLqix - \omega fLdix}{-Vx + (Rd + pLd)ix + \omega fLqiy - \omega fLdiy}\right\} \quad (1)$$

where Rd denotes the winding resistance related to the d axis of the coordinate system d-q in an equivalent circuit of the motor 6; Ld and Lq denote the winding inductances related to the d axis and the q axis of the coordinate system d-q respectively; and p denotes a differential operator (d/dt). The block 15 receives information of the voltages Vy and Vx from the block 23 which is also referred to as the coordinate transformation block 23. The block 15 receives information of the angular velocity ωf from the block 14 which is also referred to as the fixed low pass filter block 14 or the fixed LPF block 14.

The block 41 which is referred to as the variable LPF block 41 receives information of the calculated rotational angle θ from the rotational angle calculation block 15. The variable LPF block 41 provides a digital filter equivalent to an analog low pass filter of a 1-order delay type. The variable LPF block 41 calculates a filtering-resultant rotational angle θf from the calculated rotational angle θ by referring to the following equation.

$$\theta f(n) = \frac{\theta(n) + a \cdot \theta f(n-1)}{1 + a} \quad (2)$$

where "a" denotes a variable filter constant; the adscript "(n)" indicates that the related value is provided in the current period of control, that is, the current execution cycle of the program; and the adscript "(n-1)" indicates that the related value is provided in the immediately-preceding period of control, that is, the immediately-preceding execution cycle of the program. The variable LPF block 41 receives information of the immediately-preceding calculated rotational angle θf(n-1) from the block 42 which is referred to as the 2π correction block 42.

The 2π correction block 42 receives information of the filtering-resultant calculated rotational angle θf from the variable LPF block 41, and uses the calculated rotational angle θf in the next period of control (the next execution cycle of the program) as the immediately-preceding angle θf(n-1). Also, the 2π correction block 42 receives the information of the calculated rotational angle θ from the rotational angle calculation block 15, and uses the calculated rotational angle θ as the current angle θ (n). The 2π correction block 42 calculates the value "θ(n)·θf(n-1)" and the value "θf(n-1) θ(n)".

FIG. 4 shows a time-domain variation in the rotational angle θ of the rotor of the motor 6 which occurs when the rotor of the motor 6 continues to rotate in a normal direction (a positive or forward direction) at a fixed angular velocity. As shown by the solid straight lines in FIG. 4, the rotational angle θ of the rotor of the motor 6 linearly increases from -180° to +180° during every rotation period. The increase in the rotational angle θ of the rotor of the motor 6 periodically recurs. With respect to a variation in the rotational angle θ of the rotor of the motor 6, there are discontinuous points at ends of rotation periods. Specifically, the rotational angle θ of the rotor of the motor 6 discontinuously changes from +180° to -180° at ends of rotation periods. The values of the calculated rotational angle θf(n-1) and the values of the calculated rotational angle θ(n) distribute on the solid straight lines in FIG. 4 with certain dispersions corresponding to errors.

It is preferable that the period of reiterative control (the period of reiterative execution of the program) is set remarkably shorter than the period of rotation of the motor 6. Under this setting, the calculated rotational angles θf(n-1) and θ(n) available at moments near a discontinuous point and in opposite sides of the discontinuous point are close to an angle of +180° and an angle of -180° respectively. In the example shown by FIG. 4, the calculated rotational angles θf(n-1) and θ(n) are equal to +170° and -170° respectively. Thus, the calculated rotational angles θf(n-1) and θ(n) have opposite signs respectively. Further, in the case of normal rotation or forward rotation of the motor 6, the value "θf(n-1)-θ(n)" is equal to a positive value near 2π (radian). On the other hand, in the case of reverse rotation of the motor 6, the value "θf(n-1)-θ(n)" is equal to a negative value near -2π (radian).

The 2π correction block 42 decides whether or not the value "θf(n-1)-θ(n)" is close to 2π (radian) by referring to a given threshold value equal to π. In addition, the 2π correction block 42 decides whether or not the value "θf(n-1)-π(n)" is close to -2π (radian) by referring to a given threshold value equal to -π. Further, the 2π correction block 42 decides whether or not the value "θ(n)·θf(n-1)" is negative.

In the case where the value "θ(n)·θf(n-1)" is negative and the value "θf(n-1)-θ(n)" is greater than the threshold value π, the 2π correction block 42 decides that normal rotation of the motor 6 occurs, and that the immediately-preceding angle θf(n-1) and the current angle θ(n) correspond to moments in opposite sides of a discontinuous point respectively. In this case, the 2π correction block 42 calculates the value "θf(n-1)-2π", and substitutes the value "θf(n-1)-2π" for the value "θf(n-1)" to implement the correction. In other words, the value "θf(n-1)" is updated or corrected to the value "θf(n-1)-2π".

In the case where the value "θ(n)·θf(n-1)" is negative and the value "θf(n-1)-θ(n)" is smaller than the threshold value -π, the 2π correction block 42 decides that reverse rotation of the motor 6 occurs, and that the immediately-preceding angle θf(n-1) and the current angle θ(n) correspond to moments in opposite sides of a discontinuous point respectively. In this case, the 2π correction block 42 calculates the value "θf(n-1) +2π", and substitutes the value "θf(n-1) +2π" for the value "θf(n-1)" to implement the correction. In other words, the value "θf(n-1)" is updated or corrected to the value "θf(n-1)+2π".

In the case where the previously-indicated conditions are not satisfied, the 2π correction block 42 decides that the immediately-preceding angle θf(n-1) and the current angle θ(n) do not correspond to moments in opposite sides of a discontinuous point respectively. In this case, the 2π correction block 42 does not execute the correction.

The previously-indicated equation (2) provides a weighted mean between the current angle θ(n) and the immediately-preceding angle θf(n-1). As previously described, in the case where the immediately-preceding angle θf(n-1) and the current angle θ(n) correspond to moments in opposite sides of a discontinuous point respectively during normal rotation of the motor 6, the correction by the block 42 uses the value "θf(n−1)−2π" as the value "θf(n−1)". Accordingly, a weighted mean between the angles θ(n) and θf(n−1) are available on the trajectory (the locus) of the rotational angle of the rotor of the motor 6. In the example shown by FIG. 4, the value "θf(n−1)−2π" is equal to 170°−360°, that is, −190°. Further, the angle θf(n−1) is corrected to −190°. Thus, the moment corresponding to the angle θf(n−1) is moved from the straight line L1 to a point on a past-side extension of the straight line L2 by the correction, and the filtering-resultant rotational angle θf(n) is calculated by referring to the previously-indicated equation (2). Accordingly, the filtering-resultant rotational angle θf(n) exists in the range of −190° to −170°.

The previously-indicated filter constant "a" is varied in accordance with the calculated angular velocity ωf so that the width of the pass band of the low pass filter provided by the block 41 depends on the calculated angular velocity ωf. Specifically, in the case where the angular velocity of the rotor of the motor 6 is lower than 30 rpm, the filter constant "a" is set to 30 which corresponds to a narrow pass band width. In the case where the angular velocity of the rotor of the motor 6 is between 30 rpm and 200 rpm, the filter constant "a" is set to 15 which corresponds to an intermediate pass band width. In the case where the angular velocity of the rotor of the motor 6 is equal to or higher than 200 rpm, the filter constant "a" is set to 2 which corresponds to a wide pass band width.

The variable LPF block 41 suppresses an error in the calculation of the rotational angle. In the case where the rotor of the motor 6 rotates at a low speed, the width of the pass band of the low pass filter provided by the block 41 is narrow so that ripple components are removed from the calculated rotational angle θf.

Thus, the resultant rotational angle θf calculated by the block 41 is stable and ripple-free. In the case where the rotor of the motor 6 rotates at a high speed, the width of the pass band of the low pass filter provided by the block 41 is wide so that the delay of the phase of the calculated rotational angle θf is suppressed. In addition, a moderate ripple-suppressing effect is available.

The block 12 which is also referred to as the coordinate transformation block 12 receives the information of the phase currents ix and iy from the 3-phase/2-phase conversion block 11. As previously described, the phase currents ix and iy are defined in the stationary orthogonal coordinate system x-y. In addition, the coordinate transformation block 12 receives the information of the calculated rotational angle θf from the variable LPF block 41. The coordinate transformation block 12 uses the variable θ as an indication of the calculated rotational angle θf. The coordinate transformation block 12 changes the phase currents ix and iy into phase currents id and iq in the rotational orthogonal coordinate system d-q by referring to the following equation.

$$\begin{bmatrix} iy \\ ix \end{bmatrix} = \begin{bmatrix} \cos\theta & -\sin\theta \\ \sin\theta & \cos\theta \end{bmatrix} \begin{bmatrix} id \\ iq \end{bmatrix} \quad (3)$$

The coordinate transformation block 12 informs the blocks 13 and 22 of the phase currents id and iq.

The block 13 which is also referred to as the angular velocity calculation block 13 calculates the angular velocity ω from the phase currents id and iq by referring to the following equation.

$$\omega = \frac{Vq - (Rd + pLq)iq}{\phi f + Ldid} \quad (4)$$

where Vq denotes the voltage related to the q axis in the rotational coordinate system d-q; Rd denotes the winding resistance related to the d axis of the coordinate system d-q in an equivalent circuit of the motor 6; Ld and Lq denote the winding inductances related to the d axis and the q axis of the coordinate system d-q respectively; φf denotes the rotor magnetic flux; and p denotes a differential operator (d/dt). The angular velocity calculation block 13 receives information of the voltage Vq from the block 22 which is also referred to as the current control block 22.

The fixed LPF block 14 receives information of the calculated angular velocity ω from the angular velocity calculation block 13. The fixed LPF block 14 corrects the calculated angular velocity ω into a correction-resultant angular velocity ωf (a filtering-resultant angular velocity ωf) through processing which corresponds to a low pass filter. The fixed LPF block 14 removes ripple components from the calculated angular velocity ω. The fixed LPF block 14 informs the rotational angle calculation block 15, the variable LPF block 41, and the current control block 22 of the filtering-resultant angular velocity ωf.

The block 21 which is also referred to as the command current generation block 21 receives a signal representative of a command torque (a target torque) from a suitable device external with respect to the control unit 3. The command current generation block 21 determines command currents id* and iq* in response to the command torque. The command current generation block 21 informs the current control block 22 of the command currents id* and iq*.

The current control block 22 calculates two command phase voltages Vd and Vq which are defined in the rotational coordinate system d-q. Specifically, the command phase voltages Vd and Vq are calculated from the command currents id* and iq* according to the following equations.

$$Vd = (Kdp + Kdi/s)(id^* - id) - \omega fLqiq \quad (5)$$

$$Vq = (Kqp + Kqi/s)(iq^* - iq) + \omega fLdid + \omega f\phi f \quad (6)$$

where Kdp and Kqp denote proportion gains related to the d axis and the q axis respectively, and Kdi and Kqi denote integral gains related to the d axis and the q axis respectively. The equations (5) and (6) represent Laplace transforms using s as a variable. As shown in the equations (5) and (6), the command phase voltages Vd and Vq include proportion and integral terms, that is, PI terms corresponding to the current deviations (id*−id) and (iq*−iq).

The coordinate transformation block 23 receives information of the command phase voltages Vd and Vq from the current control block 22. In addition, the coordinate transformation block 23 receives the information of the calculated rotational angle θf from the variable LPF block 41. The coordinate transformation block 23 uses the variable θ as an indication of the calculated rotational angle θf. The coordinate transformation block 23 changes the command phase voltages Vd and Vq into command phase voltages Vx and Vy in the stationary orthogonal coordinate system x-y by referring to the following equation.

$$\begin{bmatrix} Vy \\ Vx \end{bmatrix} = \begin{bmatrix} \cos\theta & -\sin\theta \\ \sin\theta & \cos\theta \end{bmatrix} \begin{bmatrix} Vd \\ Vq \end{bmatrix} \quad (7)$$

The block 24 which is also referred to as the 2-phase/3-phase conversion block 24 receives information of the command phase voltages Vx and Vy from the coordinate transformation block 23.

The 2-phase/3-phase conversion block 24 changes the two command phase voltages Vx and Vy into three command phase voltages VU, VV, and VW. The 2-phase/3-phase conversion block 24 informs the PWM block 25 of the three command phase voltages VU, VV, and VW.

Figure 5:
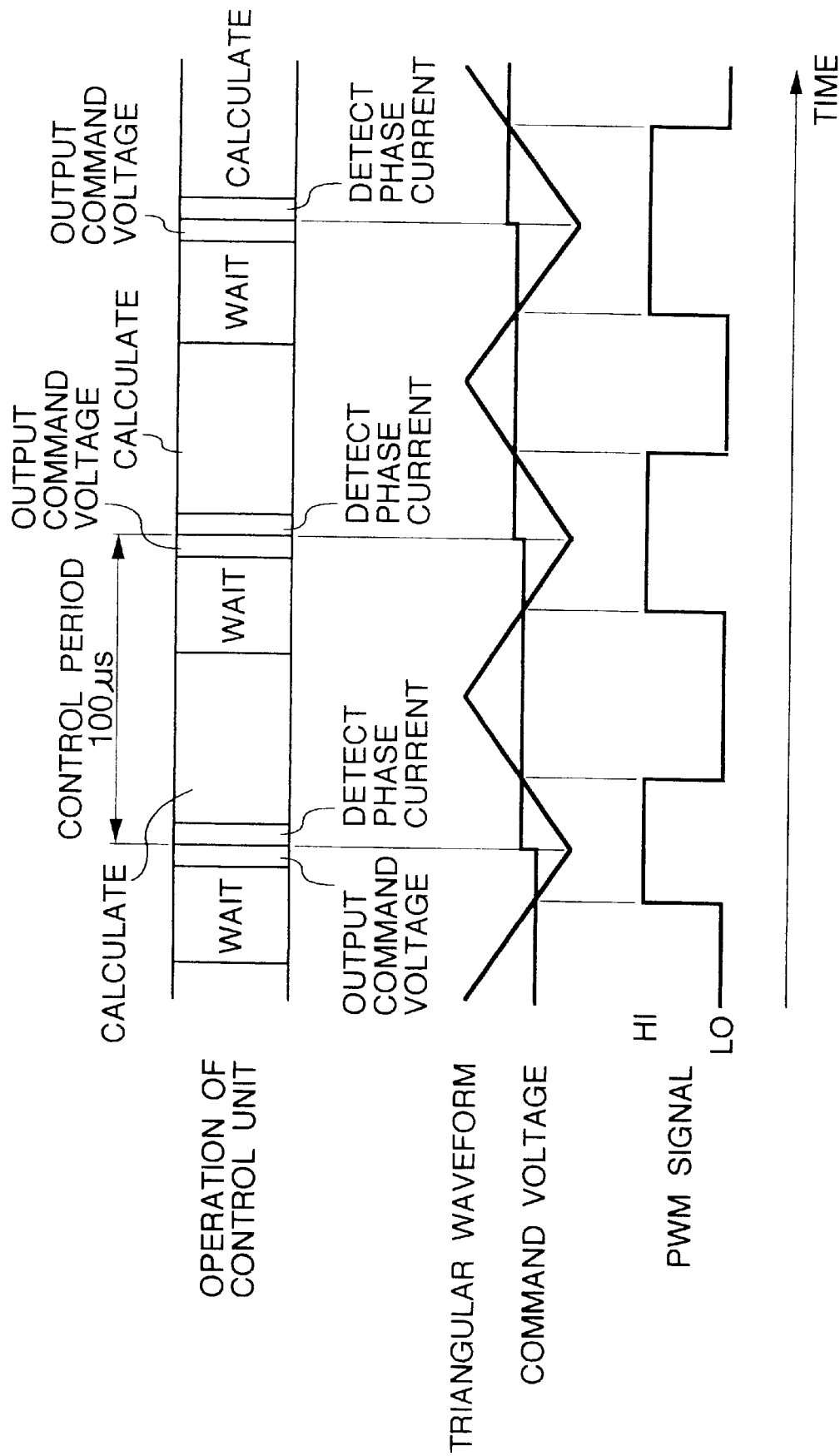
FIG. 5 is a time-domain diagram of the state of operation of the control unit and various signals in the apparatus of FIG. 1.

As shown in FIG. 5, the operation of the control unit 3 sequentially and cyclically changes among a phase current detecting state, a calculating state, a waiting state, and a command voltage outputting state. One cycle of the operation of the control unit 3, that is, the period of reiterative control, is equal to a given time interval, for example, 100 μs. A head of every cycle of the operation of the control unit 3 corresponds to the state for detecting or accepting the information of the phase currents iU and iW. The phase current detecting state is successively followed by the calculating state and the waiting state. After the waiting state, there occurs the state for outputting information of the command phase voltages VU, VV, and VW.

It is preferable that the input/output port in the control unit 3 contains D/A converters which change digital versions of the command phase voltages VU, VV, and VW into analog versions thereof. As shown in FIG. 5, each of the analog command phase voltages VU, VV, and VW is compared with a triangular waveform voltage, being converted into a PWM waveform signal. The triangular waveform voltage has a period equal to the period of reiterative control. The PWM waveform signal agrees with a binary energization signal which depends on the result of the previously-indicated comparison. The control unit 3 generates PWM waveform signals in response to the command phase voltages VU, VV, and VW respectively. The control unit 3 outputs the PWM waveform signals (the energization signals) to the inverter 5 as control signals.

Figure 6:
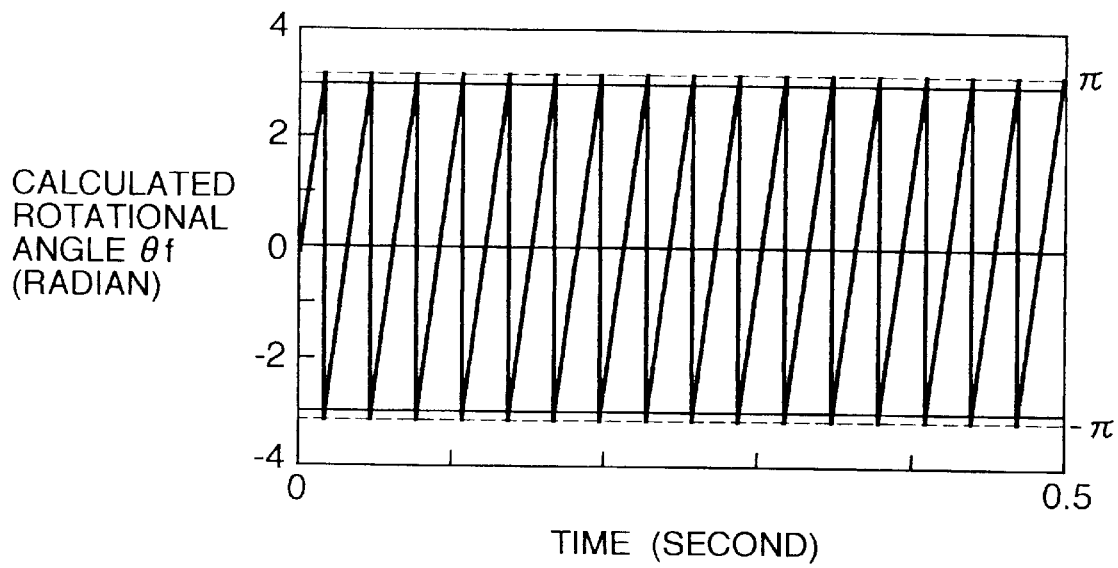
FIG. 6 is a time-domain diagram of a filtering-resultant rotational angle which is calculated in the apparatus of FIG. 1 during drive of the motor at a high angular velocity.
Figure 7:
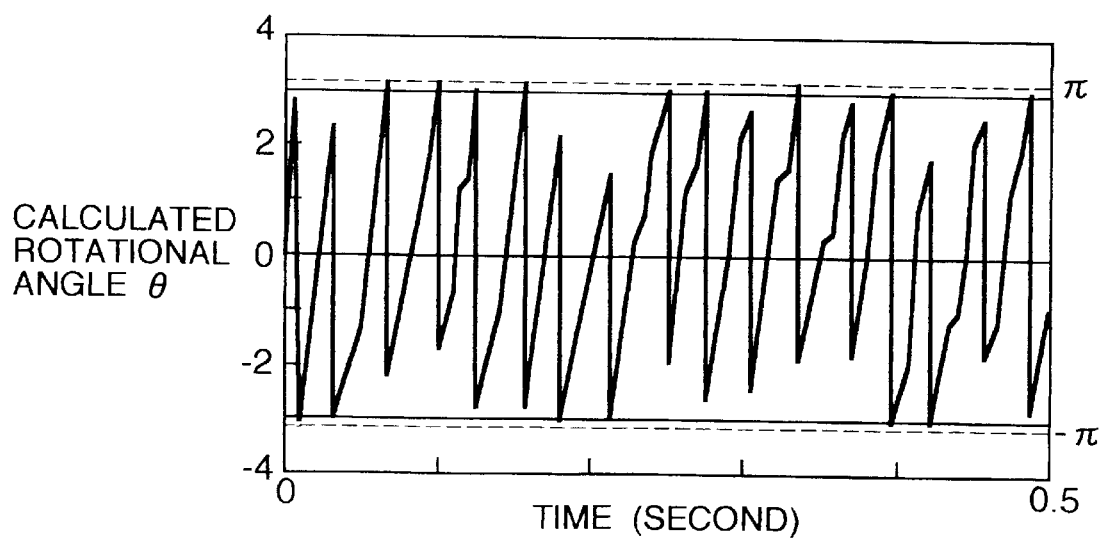
FIG. 7 is a time-domain diagram of a calculated rotational angle which occurs during drive of the motor at the high angular velocity.
Figure 8:
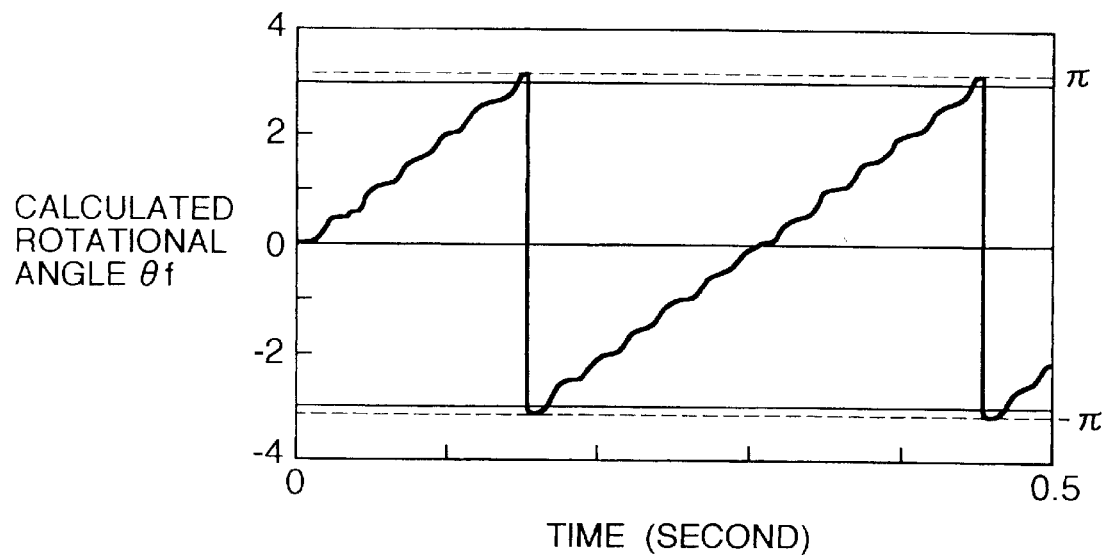
FIG. 8 is a time-domain diagram of a filtering-resultant rotational angle which is calculated in the apparatus of FIG. 1 during drive of the motor at a low angular velocity.
Figure 9:
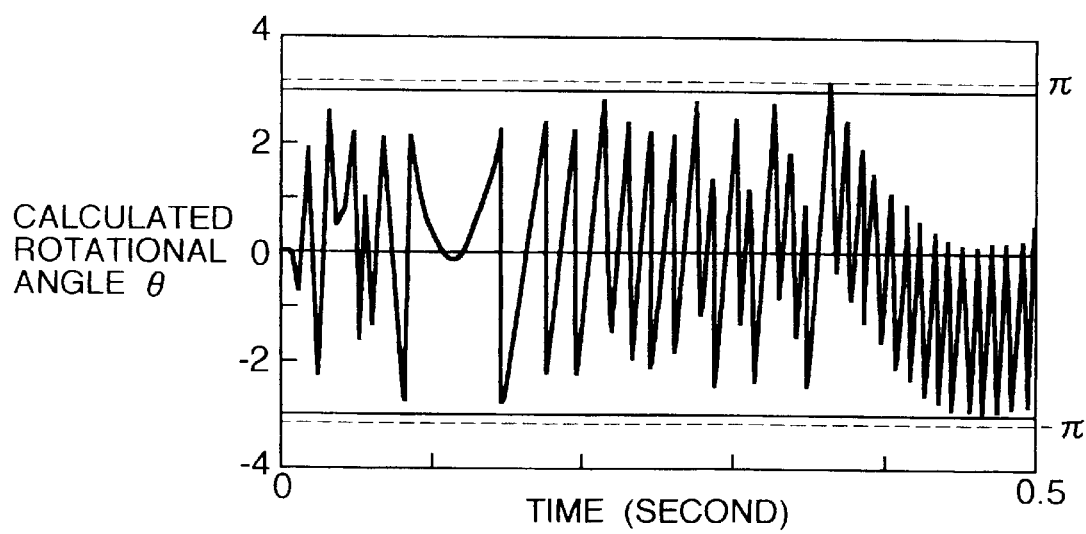
FIG. 9 is a time-domain diagram of a calculated rotational angle which occurs during drive of the motor at the low angular velocity.

For example, the motor 6 is a permanent magnet synchronous motor of a 4-pole flush (embedded) type which has a rating output power of 400 W, a rating drive current of 5 A, and a rating rotational velocity of 1,000 rpm. In the case where the command torque is equal to 1.9 Nm and the motor 6 remains driven at an angular velocity of 1,000 rpm, the filtering-resultant rotational angle θf increases at substantially a constant rate as shown in FIG. 6. On the other hand, the calculated rotational angle θ increases at varying rates as shown in FIG. 7. In the case where the command torque is equal to 0.5 Nm and the motor 6 remains driven at an angular velocity of 100 rpm, the filtering-resultant rotational angle θf increases at substantially a constant rate as shown in FIG. 8. On the other hand, the calculated rotational angle θ increases at remarkably varying rates as shown in FIG. 9. As understood from FIGS. 6, 7, 8, and 9, the filtering-resultant rotational angle θf accurately indicates the actual rotational angle of the rotor of the motor 6. This enables accurate torque control of the motor 6.

As previously described, the filter constant "a" used by the variable LPF block 41 is changed among three different values in response to the calculated angular velocity ωf. The filter constant "a" may be changed among two, four, or more different values. The filter constant "a" may also be continuously varied in accordance with the calculated angular velocity ωf.

The variable LPF block 41 may be replaced by a full-hardware variable low pass filter. The fixed LPF block 14 may be replaced by a full-hardware fixed low pass filter. The motor 6 may have windings of four or more phases.

As previously described, the 2π correction block 42 executes the decision about the value "θf(n−1)−θ(n)" by using the threshold values equal to π and −π respectively. The threshold values may be different from π and −π.

Second Embodiment

Figure 10:
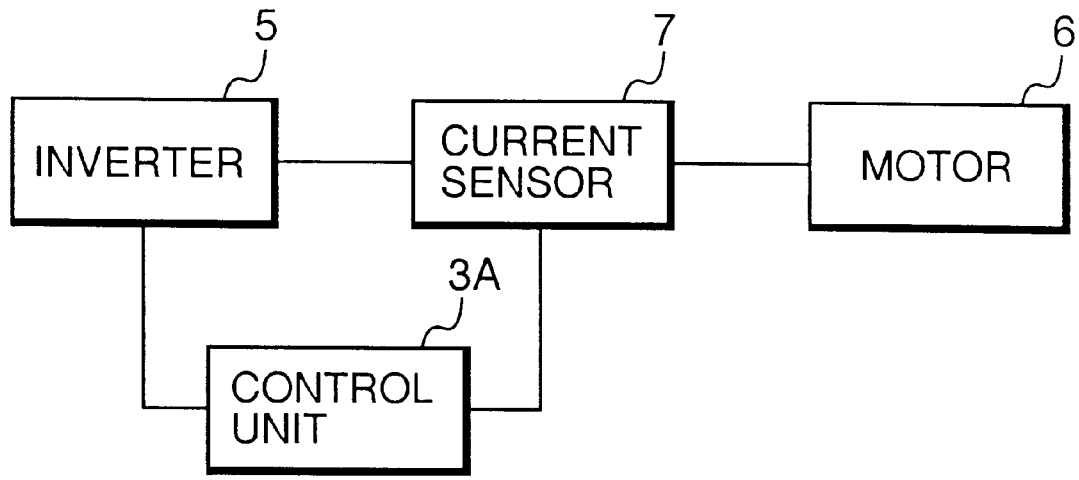
FIG. 10 is a block diagram of a sensor-less control apparatus for a permanent magnet synchronous motor according to a second embodiment of this invention.

FIG. 10 shows a second embodiment of this invention which is similar to the embodiment of FIG. 1 except that a control unit 3A replaces the control unit 3 of FIG. 1.

Figure 11:
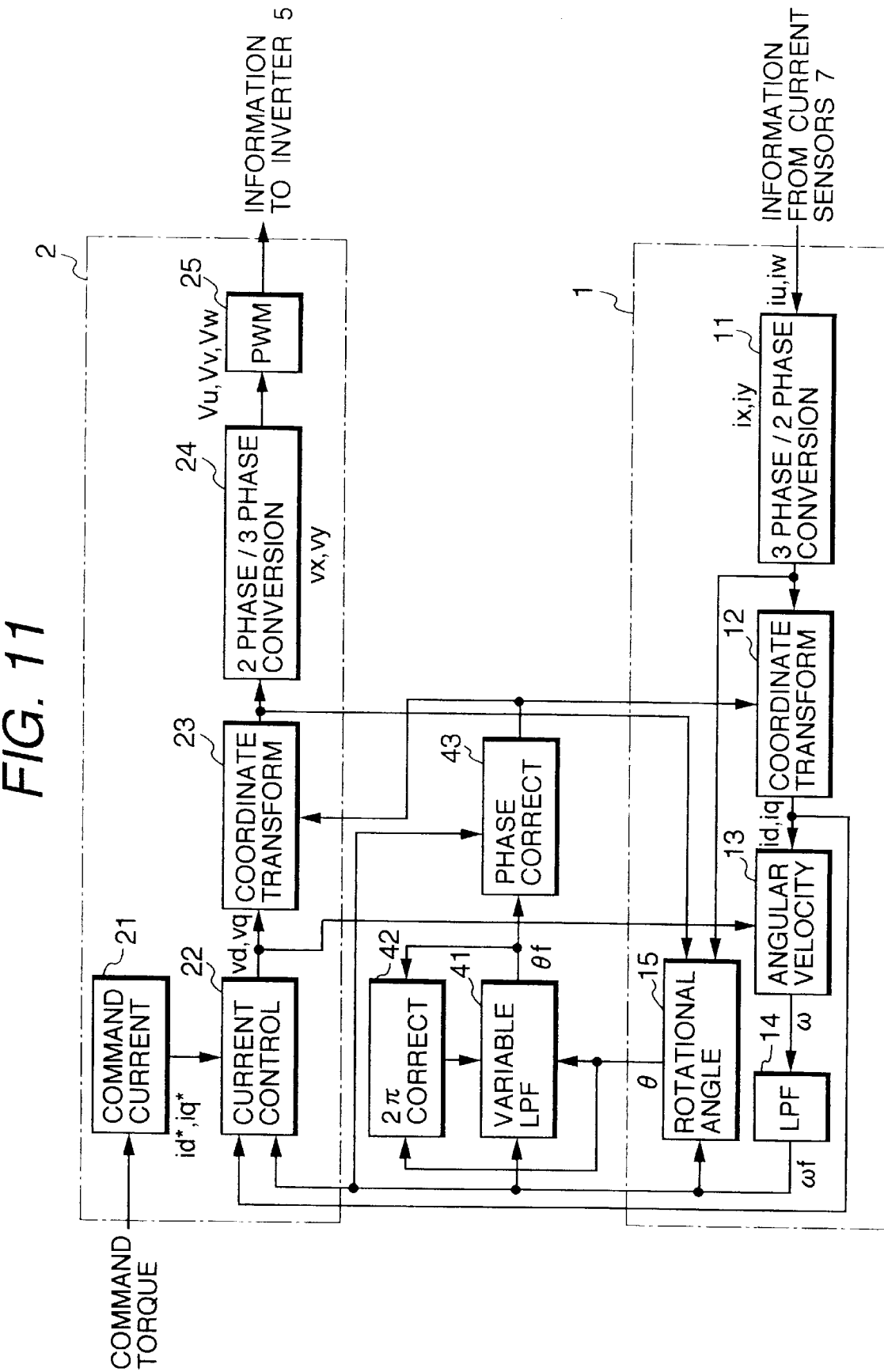
FIG. 11 is a diagram of the flow of operation of a control unit in FIG. 10.

FIG. 11 shows the flow of functions of the control unit 3A. With reference to FIG. 11, there is a newly added block 43 which is also referred to as a phase correction block 43. The phase correction block 43 receives information of a filtering-resultant rotational angle θf from a variable LPF block 41. Also, the phase correction block 43 receives information of a filtering-resultant angular velocity ωf from a fixed LPF block 14.

The variable LPF block 41 provides a delay which causes an error in the rotational angle θf. The phase correction block 43 cancels such an error in response to the angular velocity ωf, thereby correcting the rotational angle θf into an error-free rotational angle (a correction-resultant rotational angle). The phase correction block 43 informs coordinate transformation blocks 12 and 23 of the error-free rotational angle for the rotational angle θf.

The actual rotational angle of the rotor of the motor 6 increases as denoted by the broken lines in FIG. 12 while the rotational angle θf calculated by the variable LPF block 41 increases as denoted by the solid lines in FIG. 12. The actual rotational angle linearly changes from −180° to +180° during every period of rotation of the motor 6. This change in the actual rotational angle periodically recurs.

Since the calculated rotational angle θf has a term including a a value provided in an immediately-preceding period of reiterative control (see the equation (2)), the calculated rotational angle θf delays from the actual rotational angle by a certain time lag as shown in FIG. 12. The delay is now denoted by θd. The delay θd is proportional to a variation in the rotational angle θf which occurs during one period of reiterative control. Thus, the delay θd is proportional to the value ωf·Δt where Δt denotes one period of reiterative control. In addition, the delay θd is proportional to a filter constant "a" used in the variable LPF block 41 which corresponds to a weighting coefficient related to a 1-order delay component θf(n−1) in the equation (2). Accordingly, a corrective value for the delay θd is set to the value a·ωf·Δt.

The angular velocity ωf is positive and negative during normal rotation (forward rotation) and reverse rotation of the rotor of the motor 6 respectively. Therefore, the corrective value a·ωf·Δt is positive and negative during normal rotation and reverse rotation of the rotor of the motor 6 respectively. The phase correction block 43 adds the corrective value a·ωf·Δt to the calculated rotational angle θf, thereby updating or correcting the calculated rotational angle θf into a new rotational angle θf (a correction-resultant rotational angle θf). As previously described, the phase correction block 43 informs the coordinate transformation blocks 12 and 23 of the correction-resultant rotational angle, that is, the error-free rotational angle.

Since an error of the calculated rotational angle θf from the actual rotational angle is canceled in this way, it is possible to implement accurate torque control of the motor 6.

As previously described, the delay corrective value used by the phase correction block 43 is equal to a·ωf·Δt. The delay corrective value may be equal to the calculated angular velocity ωf multiplied by a given coefficient.

Third Embodiment

Figure 13:
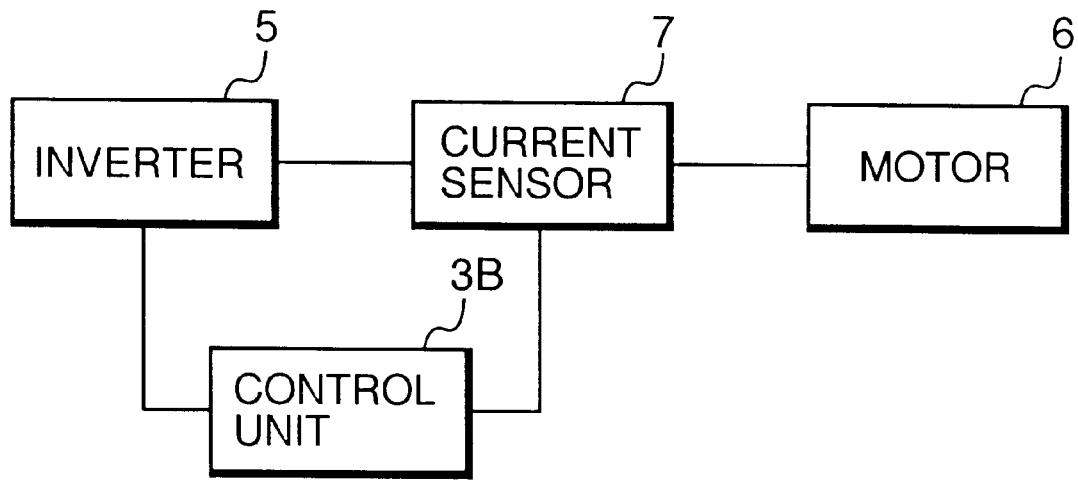
FIG. 13 is a block diagram of a sensor-less control apparatus for a permanent magnet synchronous motor according to a third embodiment of this invention.

FIG. 13 shows a third embodiment of this invention which is similar to the embodiment of FIG. 1 except that a control unit 3B replaces the control unit 3 of FIG. 1.

Figure 14:
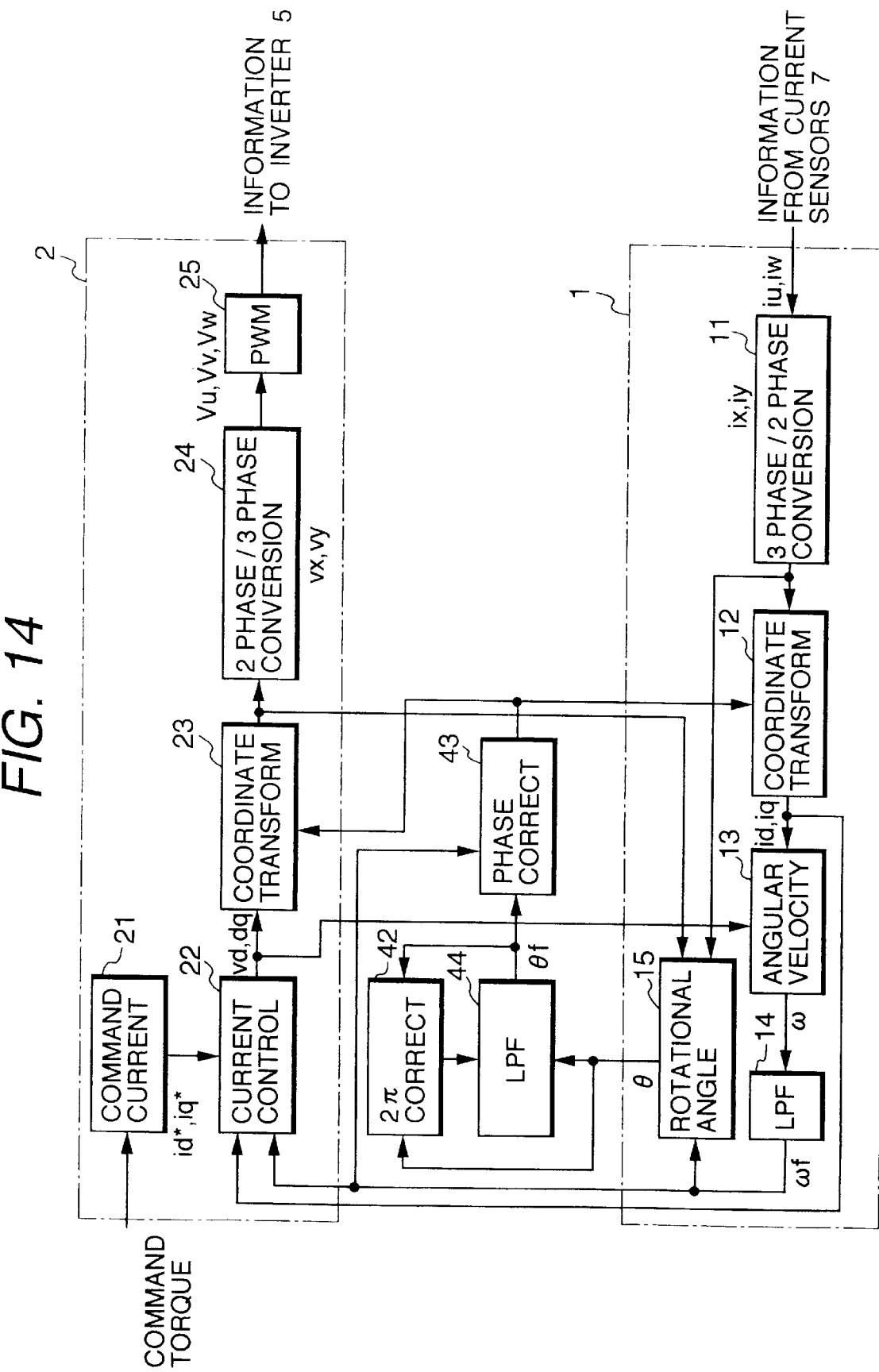
FIG. 14 is a diagram of the flow of operation of a control unit in FIG. 13.

FIG. 14 shows the flow of functions of the control unit 3B. With reference to FIG. 14, there is a fixed low pass filter block (a fixed LPF block) 44 which replaces the variable LPF block 41 in FIG. 2. The fixed LPF block 44 uses a fixed filter constant "a" which is independent of a calculated angular velocity ωf. The fixed LPF block 44 provides a digital filter equivalent to an analog low pass filter of a 1-order delay type. It is preferable to predetermine the filter constant "a" in accordance with a desired range of the angular velocity of a motor 6. Since the filter constant "a" is fixed, the pass band of the low pass filter provided by the fixed LPF block 44 remains unchanged independent of the calculated angular velocity ωf. In the case where the filter constant "a" is equal to 15, good control characteristics are available at a rotor angular velocity in the range of 30 rpm to 200 rpm. It is preferable to preset the filter constant "a" to an optimal value when the motor 6 is continuously operated at a given angular velocity.

With reference to FIG. 14, there is a phase correction block 43 similar to that in FIG. 11. As previously described, the phase correction block 43 uses a delay corrective value (a·ωf·Δt) which depends on the calculated angular velocity ωf. In the case where a desired range of the rotor angular velocity is narrow or the rotor angular velocity is fixed, the delay corrective value may be independent of the calculated angular velocity ωf.

Fourth Embodiment

Figure 15:
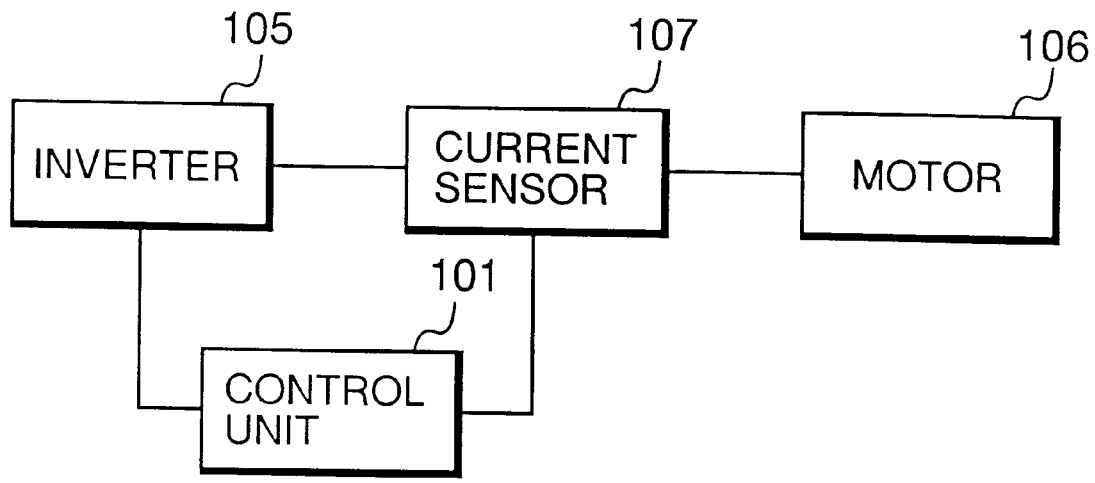
FIG. 15 is a block diagram of a sensor-less control apparatus for a permanent magnet synchronous motor according to a fourth embodiment of this invention.

With reference to FIG. 15, a control unit 101 receives a signal representative of a command torque (a target torque) from a suitable device (not shown). An inverter 105 feeds phase currents iU, iV, and iW to armature windings of a permanent magnet synchronous motor 106 respectively. Therefore, the rotor in the motor 106 rotates in response to the phase currents iU, iV, and iW. Current sensors 107 associated with two of current feed lines 108 between the inverter 105 and the motor 106 detect the phase currents iU and iW, and output signals representing the detected phase currents iU and iW. The control unit 101 receives the output signals of the current sensors 107.

The control unit 101 generates control signals in response to the command torque and the detected phase currents iU and iW. The control unit 101 outputs the control signals to the inverter 105. The inverter 105 generates the phase currents iU, iV, and iW in response to the output signals of the control unit 101.

The control unit 101 includes a DSP (a digital signal processor), a microcomputer, or a similar device which has a combination of an input/output port (an interface), a processing section, a ROM, and a RAM. The control unit 101 operates in accordance with a program stored in the ROM. The program is iteratively executed at a given short period (equal to, for example, 100 μs) so that control implemented by the control unit 101 recurs at the same period. The input/output port contains a timer interface capable of generating and outputting PWM (pulse width modulation) waveform signals, A/D converters for changing analog signals into corresponding digital signals, and D/A converters for changing digital signals into corresponding analog signals.

Figure 16:
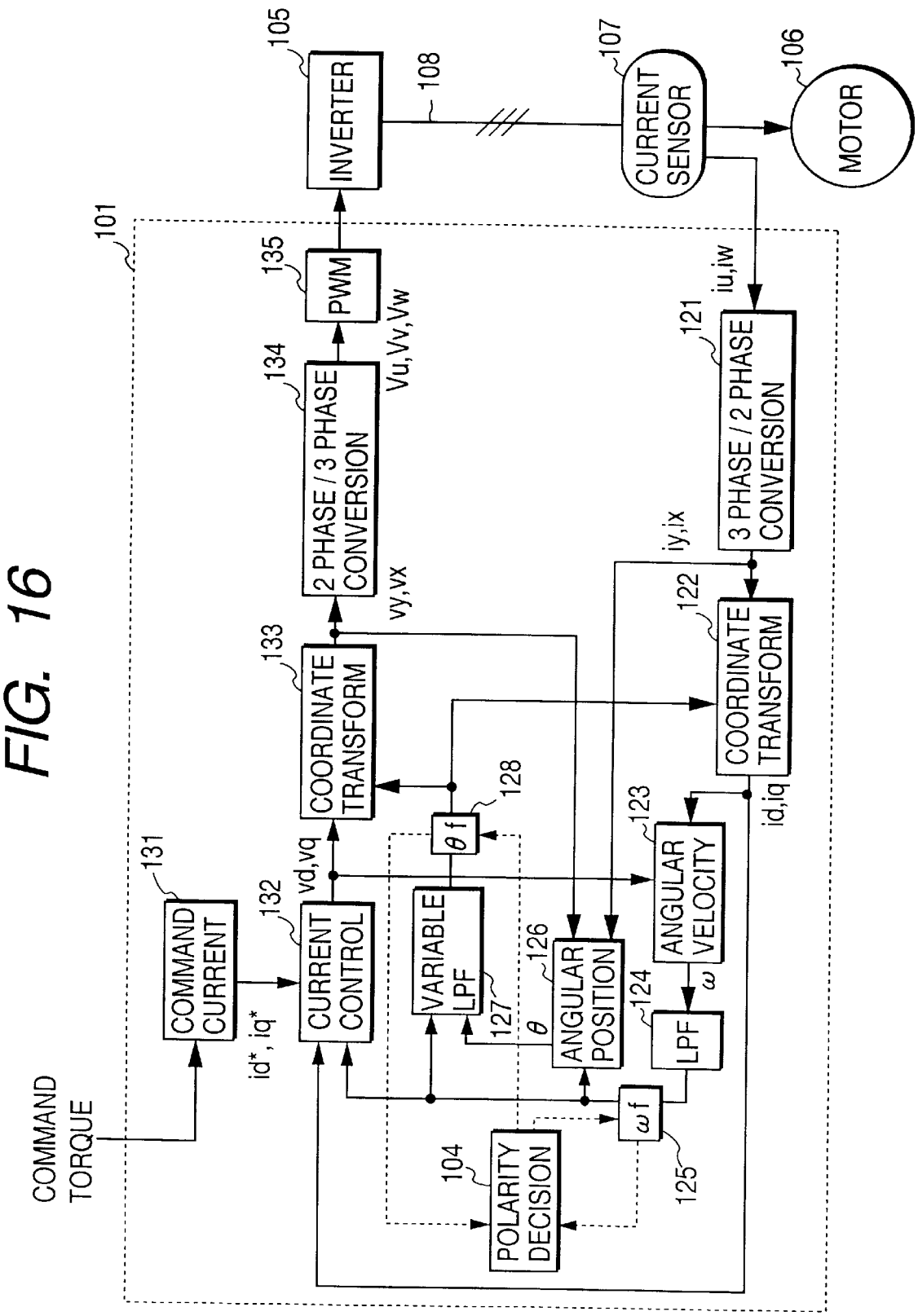
FIG. 16 is a diagram of the flow of operation of a control unit in FIG. 15.

FIG. 16 shows the flow of functions of the control unit 101. The functions of the control unit 101 are determined by software, that is, the previously-mentioned program. It should be noted that FIG. 16 does not show the hardware structure of the control unit 101.

With reference to FIG. 16, there is a PWM block 135 which generates energization signals in response to signals of command voltages (target voltages) VU, VV, and VW. The energization signals generated by the PWM block 135 are transmitted from the control unit 101 to the inverter 105. The inverter 105 generates three pulse currents (three phase currents iU, iV, and iW) in response to the energization signals, and feeds the generated pulse currents to the armature windings of the motor 106 respectively. Two phase currents iU and iW among the three phase currents are detected by the current sensors 107. The current sensors 107 generate signals representing the detected phase currents iU and iW. The current sensors 107 output the phase-current signals to the control unit 101.

In FIG. 16, there is a polarity deciding block 104 which determines whether or not the polarity of a magnetic field generated by the rotor of the motor 106 is accurately recognized. When the polarity deciding block 104 determines that the polarity of the magnetic field is erroneously recognized, the polarity deciding block 104 corrects a calculated angular position and a calculated angular velocity of the rotor of the motor 106. On the other hand, when the polarity deciding block 104 determines that the polarity of the magnetic field is accurately recognized, the polarity deciding block 104 avoids correcting the calculated angular position and the calculated angular velocity of the rotor of the motor 106.

In FIG. 16, there is a 3-phase/2-phase conversion block 121 which receives information of the detected phase currents iU and iW from the current sensors 107. The 3-phase/2-phase conversion block 121 calculates the other phase current iV from the phase currents iU and iW according to the following equation.

$$iV = -iU - iW \tag{8}$$

Then, the 3-phase/2-phase conversion block 121 changes the three phase currents iU, iV, and iW into two phase currents ix and iy defined in a given stationary orthogonal coordinate system x-y. This change is implemented by referring to the following equations.

$$iy = \sqrt{\frac{2}{3}} \cdot \left(iU - \frac{1}{2}iV - \frac{1}{2}iW\right) \tag{9A}$$

$$ix = \sqrt{\frac{1}{2}} \cdot (iV - iW) \tag{9B}$$

As shown in FIG. 3, the orthogonal coordinate system x-y is angularly offset from a rotational orthogonal coordinate system d-q by an angle (a rotational angle) θ. The orthogonal coordinate system d-q moves together with the rotor in the motor 106.

With reference back to FIG. 16, the 3-phase/2-phase conversion block 121 informs a rotor position detecting block 126 of the phase currents ix and iy. The rotor position detecting block 126 is also informed of voltages Vy and Vx defined in the orthogonal coordinate system x-y. Furthermore, the rotor position detecting block 126 is informed of an angular velocity ωf. The rotor position detecting block 126 calculates an angular position (a rotational angle) θ of the rotor in the motor 106 from the phase currents ix and iy, the voltages Vy and Vx, and the angular velocity ωf by referring to the following equation.

$$\tan\theta = \frac{Vy - (Rd + pLd)iy + \omega f(Lq - Ld)ix}{-Vx + (Rd + pLd)ix + \omega f(Lq - Ld)iy} \tag{10}$$

where Rd denotes the winding resistance related to the d axis of the coordinate system d-q in an equivalent circuit of the motor 106; Ld and Lq denote the winding inductances related to the d axis and the q axis of the coordinate system d-q respectively; and p denotes a differential operator (d/dt). The calculated angular position θ has two candidate values in the range of −π to π which differ from each other by π radians. Selection is given of one of the two candidate values which has continuity with an angular position value used in the immediately-preceding control period of time. The selected candidate value is used as the calculated angular position θ. The rotor position detecting block 126 receives information of the voltages Vy and Vx from a coordinate transformation block 133.

The rotor position detecting block 126 receives information of the angular velocity ωf from an angular velocity buffer block 125 which is available in the immediately-preceding control period of time.

A variable LPF block 127 receives information of the calculated rotational angle θ from the rotor position detecting block 126. The variable LPF block 127 receives the information of the angular velocity ωf from the angular velocity buffer block 125. The variable LPF block 127 provides a digital filter equivalent to an analog low pass filter of a 1-order delay type. The digital filer provided by the variable LPF block 127 is designed so that the passband width thereof will narrow as the angular velocity ωf decreases. The variable LPF block 127 calculates a filtering-resultant angular position (a filtering-resultant rotational angle) θf from the calculated angular position θ by referring to the following equation.

$$\theta f(n) = \frac{\theta(n) + ao \cdot \theta f(n-1)}{1 + ao} \quad (11)$$

where "ao" denotes a variable filter constant; the adscript "(n)" indicates that the related value is provided in the current control period of time, that is, the current execution cycle of the program;

and the adscript "(n−1)" indicates that the related value is provided in the immediately-preceding control period of time, that is, the immediately-preceding execution cycle of the program. The filter constant "ao" is designed to depend on the angular velocity ωf. Specifically, as the angular velocity cof increases, the filter constant "ao" decreases and hence the passband width of the filter widens. This designing of the filter constant "ao" suitably provides an effect of reducing a phase delay of the filtering-resultant angular position θf as well as an effect of reducing ripple therein. The variable LPF block 127 informs an angular position buffer block 128 of the filtering-resultant angular position θf.

A coordinate transformation block 122 receives the information of the phase currents ix and iy from the 3-phase/2-phase conversion block 121. As previously explained, the phase currents ix and iy are defined in the stationary orthogonal coordinate system x-y. In addition, the coordinate transformation block 122 receives information of the calculated angular position θf from the angular position buffer block 128. The coordinate transformation block 122 uses the variable θ as an indication of the calculated angular position θf. The coordinate transformation block 122 changes the phase currents ix and iy into phase currents id and iq in the rotational orthogonal coordinate system d-q by referring to the following equation.

$$\begin{bmatrix} id \\ iq \end{bmatrix} = \begin{bmatrix} \cos\theta & \sin\theta \\ -\sin\theta & \cos\theta \end{bmatrix} \begin{bmatrix} iy \\ ix \end{bmatrix} \quad (12)$$

The coordinate transformation block 122 informs an angular velocity detecting block 123 and a current control block 132 of the phase currents id and iq.

The angular velocity detecting block 123 calculates the angular velocity ω of the rotor in the motor 106 from the phase currents id and iq by referring to the previously-indicated equation (4) which includes the term of the voltage Vq. The angular velocity detecting block 123 receives information of the voltage Vq from the current control block 132.

A fixed LPF block 124 receives information of the calculated angular velocity ω from the angular velocity detecting block 123. The fixed LPF block 124 corrects the calculated angular velocity ω into a correction-resultant angular velocity (a filtering-resultant angular velocity) ωf through processing which corresponds to a low pass filter. Specifically, the fixed LPF block 124 calculates the filtering-resultant angular velocity ωf by referring to the following equation.

$$\omega f(n) = \frac{\omega(n) + b \cdot \omega f(n-1)}{1 + b} \quad (13)$$

where "b" denotes a predetermined filter constant; the adscript "(n)" indicates that the related value is provided in the current control period of time, that is, the current execution cycle of the program; and the adscript "(n−1)" indicates that the related value is provided in the immediately-preceding control period of time, that is, the immediately-preceding execution cycle of the program. The fixed LPF block 124 removes ripple components from the calculated angular velocity ωf. The fixed LPF block 124 informs the angular velocity buffer block 125 of the filtering-resultant angular velocity ωf.

In FIG. 16, there is a command current generation block 131 which receives a signal representative of a command torque (a target torque) from a suitable device external with respect to the control unit 101. The command current generation block 131 determines command currents id* and iq* in response to the command torque.

The current control block 132 receives information of the command currents id* and iq* from the command current generation block 131. Also, the current control block 132 receives the information of the angular velocity ωf from the angular velocity buffer block 125. Furthermore, the current control block 132 receives information of the phase currents id and iq from the coordinate transformation block 122. The current control block 132 calculates two command phase voltages Vd and Vq which are defined in the rotational coordinate system d-q. Specifically, the command phase voltages Vd and Vq are calculated from the command currents id* and iq*, the angular velocity ωf, and the phase currents id and iq according to the following equations.

$$Vd=Kdp(id*-id)+Kdi\,(id*-id)dt-\omega fLqiq \quad (14)$$

$$Vq=Kqp(iq*-iq)+Kqi\,(iq*-iq)dt-\omega fLdid+\omega f\phi f \quad (15)$$

where Kdp and Kqp denote proportion gains related to the d axis and the q axis respectively; Kdi and Kqi denote integral gains related to the d axis and the q axis respectively; and φf denotes the rotor magnetic flux.

The coordinate transformation block 133 receives information of the command phase voltages Vd and Vq from the current control block 132. In addition, the coordinate transformation block 133 receives the information of the calculated angular position θf from the angular position buffer block 128. The coordinate transformation block 133 uses the variable θ as an indication of the calculated angular position θf. The coordinate transformation block 133 changes the command phase voltages Vd and Vq into command phase voltages Vx and Vy in the stationary orthogonal coordinate system x-y by referring to the previously-indicated equation (7).

A 2-phase/3-phase conversion block 134 receives information of the command phase voltages Vx and Vy from the coordinate transformation block 133. The 2-phase/3-phase conversion block 134 changes the two command phase voltages Vx and Vy into three command phase voltages VU, VV, and VW. This change is implemented by referring to the following equations.

$$VU = \sqrt{\frac{2}{3}} \cdot Vy \tag{16A}$$

$$VV = \sqrt{\frac{1}{6}} \cdot (-Vy + \sqrt{3} \, Vx) \tag{16B}$$

$$VW = \sqrt{\frac{1}{6}} \cdot (-Vy - \sqrt{3} \, Vx) \tag{16C}$$

The 2-phase/3-phase conversion block 134 informs the PWM block 135 of the three command phase voltages VU, VV, and VW.

The polarity deciding block 104 receives the information of the calculated angular velocity ωf from the angular velocity buffer block 125. The polarity deciding block 104 receives the information of the calculated angular position θf from the angular position buffer block 128. The polarity deciding block 104 determines whether or not the sign of the calculated angular velocity ωf agrees with the sign of an actual angular velocity in response to a time-domain variation in the calculated angular position θf. This determination corresponds to a determination as to whether or not the polarity of the magnetic field in the motor 106 is accurately recognized. In the case where the sign of the calculated angular velocity ωf differs from the sign of the actual angular velocity, the polarity deciding block 104 updates the calculated angular position θf to implement phase correction. Specifically, the polarity deciding block 104 increments the calculated angular position θf by "π". In addition, the polarity deciding block 104 updates the calculated angular velocity ωf. Specifically, the polarity deciding block 104 inverts the sign of the calculated angular velocity ωf. In this way, the polarity deciding block 104 implements sign correction. On the other hand, in the case where the sign of the calculated angular velocity ωf agrees with the sign of the actual angular velocity, the polarity deciding block 104 avoids implementing the phase correction and the sign correction.

As shown in FIG. 5, the operation of the control unit 101 sequentially and cyclically changes among a phase current detecting state, a calculating state, a waiting state, and a command voltage outputting state. One cycle of the operation of the control unit 101, that is, the period of reiterative control, is equal to a given time interval, for example, 100 μs. A head of every cycle of the operation of the control unit 101 corresponds to the state for detecting or accepting the information of the phase currents iU and iW. The phase current detecting state is successively followed by the calculating state and the waiting state. After the waiting state, there occurs the state for outputting information of the command phase voltages VU, VV, and VW.

It is preferable that the input/output port in the control unit 101 contains D/A converters which change digital versions of the command phase voltages VU, VV, and VW into analog versions thereof. As shown in FIG. 5, each of the analog command phase voltages VU, VV, and VW is compared with a triangular waveform voltage, being converted into a PWM waveform signal. The triangular waveform voltage has a period equal to the period of reiterative control. The PWM waveform signal agrees with a binary energization signal which depends on the result of the previously-indicated comparison. The control unit 101 generates PWM waveform signals in response to the command phase voltages VU, VV, and VW respectively. The control unit 101 outputs the PWM waveform signals (the energization signals) to the inverter 105 as control signals.

Figure 17:
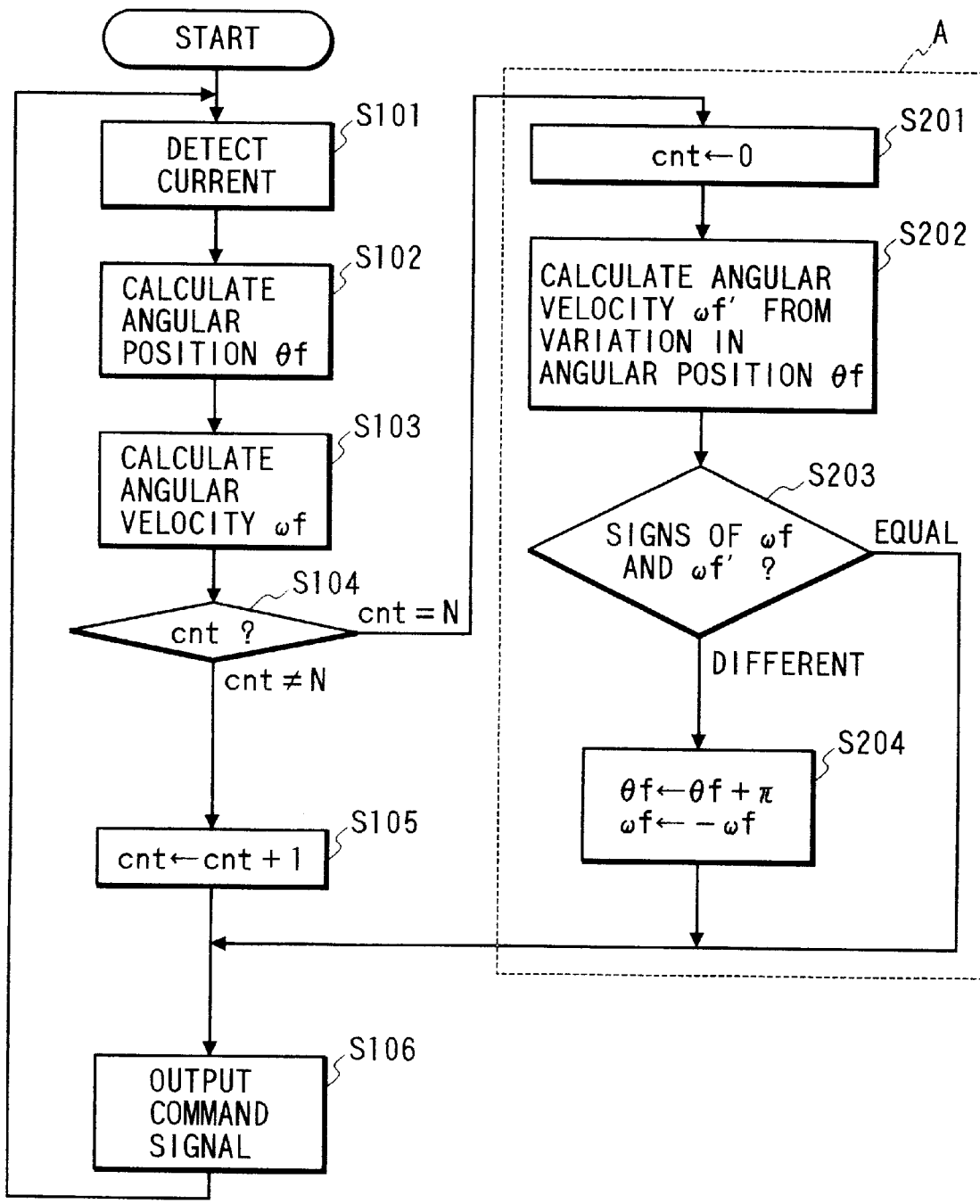
FIG. 17 is a flowchart of a program related to operation of the control unit in FIG. 15.

As previously explained, the control unit 101 operates in accordance with a program stored in its internal ROM. FIG. 17 is a flowchart of the program. The program in FIG. 17 is iteratively executed at the given period corresponding to the control period.

With reference to FIG. 17, a first step S101 of the program detects phase currents iU and iW by referring to the output signals of the current sensors 107.

A step S102 following the step S101 calculates an angular position (a rotational angle) θf of the rotor in the motor 106 from the detected phase currents iU and iW. The step S102 corresponds to the blocks 121, 126, and 127 of FIG. 16.

A step S103 subsequent to the step S102 calculates an angular velocity ωf of the rotor in the motor 106 from the detected phase currents iU and iW. The step S103 corresponds to the blocks 121, 122, 123, and 124 of FIG. 16.

A step S104 following the step S103 decides whether or not a count number "cnt" is equal to a predetermined natural number N. When the count number "cnt" is equal to the predetermined natural number N, the program advances from the step S104 to a polarity deciding routine "A". Otherwise, the program advances from the step S104 to a step S105. The count number "cnt" indicates a number of control periods. The predetermined natural number N decides a frequency of the execution of the polarity decision (the polarity deciding routine "A") during operation of the motor 106.

The step S105 increments the count number "cnt" by "1". After the step S105, the program advances to a step S106.

The polarity deciding routine "A" has steps S201, S202, S203, and S204. The step S201 which follows the step S104 resets the count number "cnt" to "0". The step S202 follows the step S201. The step S202 calculates the difference between the angular position θf(n) given by the step S102 during the current execution cycle of the program and the angular position θf(n−1) given by the step S102 during the immediately-preceding execution cycle of the program. In other words, the step S202 calculates the difference between the angular position θf(n) given during the current control period of time and the angular position θf(n−1) given during the immediately-preceding control period of time. The step S202 calculates an angular velocity ωf' of the rotor in the motor 106 from the calculated difference. Regardless of whether or not an error of about π radians is present between an actual angular position and the angular position θf calculated by the step S102, the sign of the calculated angular velocity ωf' accurately represents the direction of rotation of the rotor in the motor 106.

In the polarity deciding routine "A", the step S203 which follows the step S202 compares the sign of the angular velocity ωf given by the step S202 and the sign of the angular velocity ωf calculated by the step S103 to decide whether or not the polarity of the magnetic field in the motor 106 is accurately recognized. When the signs are different, that is, when the polarity of the magnetic filed is erroneously recognized, the program advances from the step S203 to the step S204. When the signs are equal, that is, when the polarity of the magnetic field is accurately recognized, the program jumps from the step S203 to the step S106. The step S204 changes or updates the angular position θf to implement phase correction. Specifically, the step S204 increments the angular position θf by "π" according to a program statement as "θf=θf+π". In addition, the step S204 changes or updates the angular velocity ωf. Specifically, the step S204 inverts the sign of the angular velocity ωf according to a program statement as "ωf=−ωf". In this way, the step S204 implements sign correction. After the step S204, the program advances to the step S106.

The step S106 calculates command phase voltages VU, VV, and VW from the angular position θf and the angular velocity ωf. Then, the step S106 generates energization signals in response to the command phase voltages VU, VV, and VW. Subsequently, the step S106 outputs the energization signals to the inverter 105. The step S106 corresponds to the blocks 131, 132, 133, 134, and 135 of FIG. 16. After the step S106, the program returns to the step S101 to enable the reiterative control of the motor 106.

As previously explained, there are two different values of the angular position θ which is calculated by the rotor position detecting block 126 according to the equation (10). If one of the two values which is remote from an actual angular position is selected, the calculated angular position θ differs from the actual angular position by an error of about π radians. In this case, the phase currents id and iq, which are calculated by the coordinate transformation block 122 according to the equation (12), have signs inverted with respect to those of actual phase currents. In addition, the command phase voltage Vq, which is calculated by the current control block 132 from the phase currents id and iq according to the equation (15), has a sign inverted with respect to that of a corresponding actual phase voltage. Thus, in this case, the angular velocity ω, which is calculated by the angular velocity detecting block 123 according to the equation (4), has a sign inverted with respect to that of an actual angular velocity. Regarding the equation (4), it should be noted that the value φf is significantly greater than the value Ldid, and hence the sign of the angular velocity ω is determined by that of the numerator.

Accordingly, in the case where the sign of the angular velocity ωf and the sign of the angular velocity ωf are different from each other, it is understood that one of the two values of the angular position θ which is remote from an actual angular position is selected. In other words, the polarity of the magnetic field in the motor 106 is erroneously recognized. Thus, in this case, the step S204 is executed to implement the phase correction of the angular position θ and the sign correction of the angular velocity ωf. This process by the step S204 corresponds to use or selection of the other of the two values of the angular position θ which is close to the actual angular position.

On the other hand, in the case where the sign of the angular velocity ωf and the sign of the angular velocity ωf are equal to each other, it is understood that one of the two values of the angular position θ which is close to the actual angular position is selected. In other words, the polarity of the magnetic field in the motor 106 is accurately recognized. Thus, in this case, the step S204 is not executed to avoid the phase correction and the sign correction.

The step S105 increments the count number "cnt" by "1" for every control period of time. The step S201 resets the count number "cnt" to "0" when the polarity deciding routine "A" is executed. As previously explained, the step S104 compares the count number "cnt" with the predetermined natural number N. The step S104 enables the polarity deciding routine "A" to be executed each time the count number "cnt" reaches the predetermined natural number N.

Figure 18:
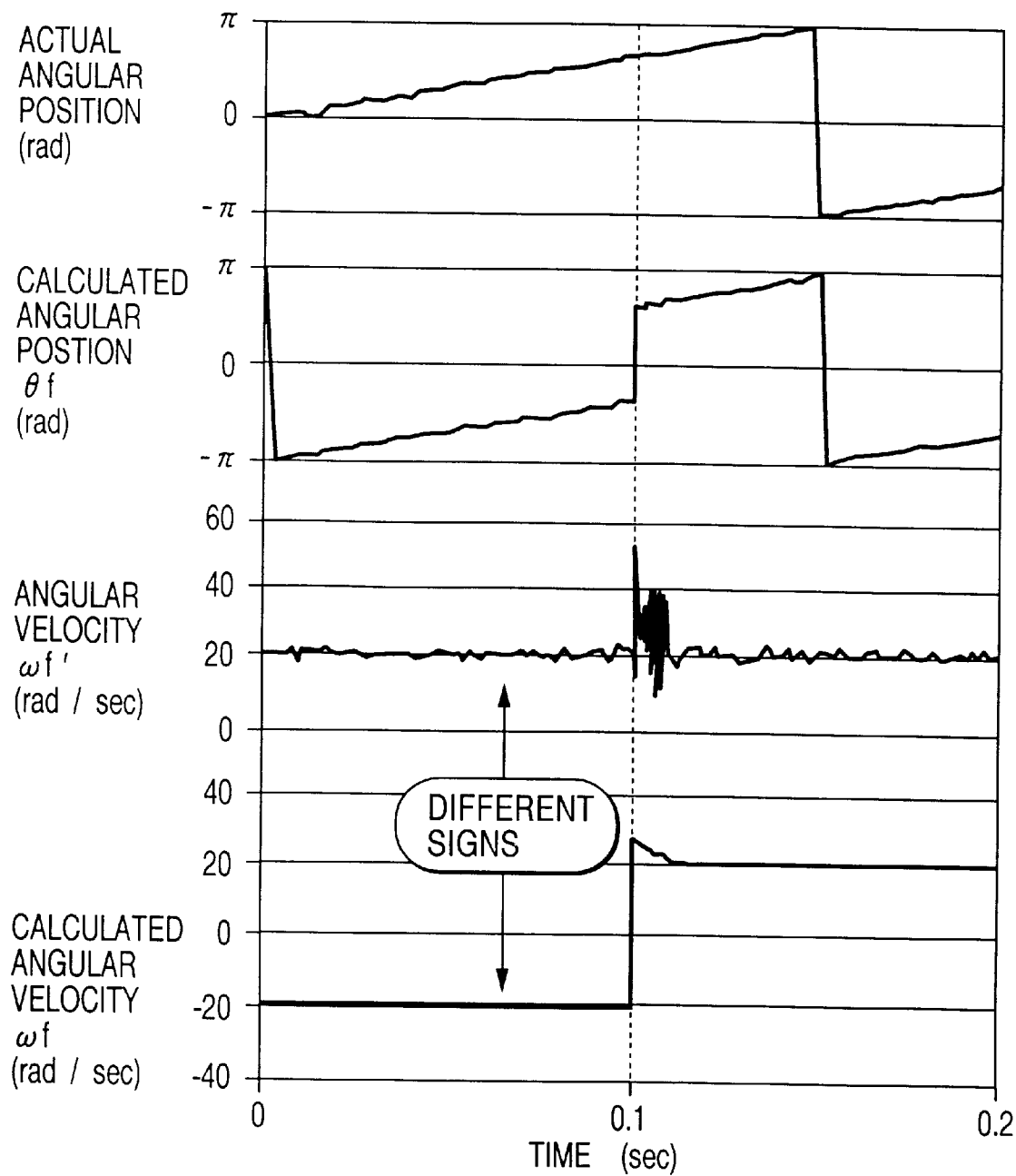
FIG. 18 is a time-domain diagram of angular positions (rotational angles) and angular velocities of the rotor in a permanent magnet synchronous motor which occur during start of the motor.

FIG. 18 shows time-domain variations in an actual angular position, a calculated angular position θf, an angular velocity ωf (calculated from the angular position θf and corresponding to an actual angular velocity), and a calculated angular velocity ωf which occur during simulation of drive of an example of the motor 106 designed as follows. The example of the motor 106 has a rating output power of 2.2 kW, a rating drive current of 8 A, and a rating rotational velocity of 3,000 rpm. The example of the motor 106 has a d-axis inductance of 9.5 mH, a q-axis inductance of 18.2 mH, and a rotor magnetic flux of 0.307 Wb.

With reference to FIG. 18, before a time of 0.1 sec elapses since motor start, the calculated angular position θf has an error of π radians from the actual angular position. In addition, the sign of the calculated angular velocity ωf is opposite to that of the (actual) angular velocity ωf. When a time of 0.1 sec elapses since motor start, the polarity deciding routine "A" in FIG. 17 is executed so that the calculated angular position θf and the calculated angular velocity ωf are corrected into agreement with the actual angular position and the (actual) angular velocity ωf respectively.

According to a modification of this embodiment, the step S204 in FIG. 17 does not implement the sign correction. In the modification of this embodiment, after the step S204 implements the phase correction, the step S103 is executed again. In this case, the step S103 changes the phase currents ix and iy into phase currents id and iq in response to the correction-resultant angular position θf by referring to the equation (12). Then, the step S103 calculates the angular velocity ω from the phase currents id and iq by referring to the equation (4). The sign of the calculated angular velocity ω is equal to that of an actual angular velocity.

It is preferable that at start of the motor 106, arbitrarily-selected one of two different values of the angular position calculated according to the equation (10) is used as an initial calculated angular position. In this case, the step S203 in FIG. 17 implements a decision as to whether or not the polarity of the magnetic filed is accurately recognized with respect to the initial calculated angular position. When the step S203 in FIG. 17 decides that the polarity of the magnetic filed is erroneously recognized, the calculated angular position and the calculated angular velocity are corrected by the step S204 in FIG. 17.

Regarding start of the motor 106, the control unit 101 may alternatively be designed to provide the following processes. At start of the motor 106, the control unit 101 determines or detects the polarity of a magnetic field generated by the rotor of the motor 106. During the polarity determination process, a voltage is instantaneously applied to an arbitrary one of the three armature windings of the motor 106 in a manner such that the rotor of the motor 106 will not rotate. Two candidate angular positions of the rotor of the motor 106 are calculated from currents responsive to the instantaneously-applied voltage. The two candidate angular positions relate to opposite directions respectively. Short-duration voltage pulses which correspond in directions (polarities) to the respective candidate angular positions are applied to the motor 106. Measurement is given of peak values (peak levels) of phase currents detected by the current sensors 107 which occur in response to the short-duration voltage pulses. The peak values of the phase currents are compared. According to non-linearity in the magnetization characteristics of the armature core of the motor 106, the phase current having a greater peak and the phase current having a smaller peak are decided as corresponding to the N pole and the S pole respectively. One of the two candidate angular positions is selected in response to the result of this polarity decision as an initial angular position of the rotor of the motor 106.

This embodiment may be applied to a decision about the polarity of the magnetic field in the case where the motor 106 starts to be effectively driven from conditions in which the motor 106 is rotating.

Fifth Embodiment

Figure 19:
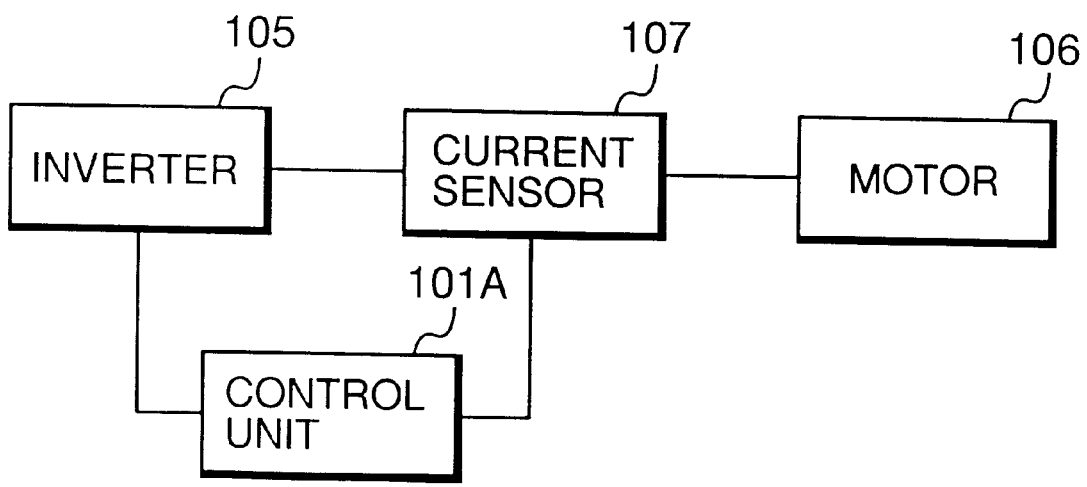
FIG. 19 is a block diagram of a sensor-less control apparatus for a permanent magnet synchronous motor according to a fifth embodiment of this invention.

FIG. 19 shows a fifth embodiment of this invention which is similar to the embodiment of FIGS. 15–18 except that a control unit 101A replaces the control unit 101 of FIG. 15.

Figure 20:
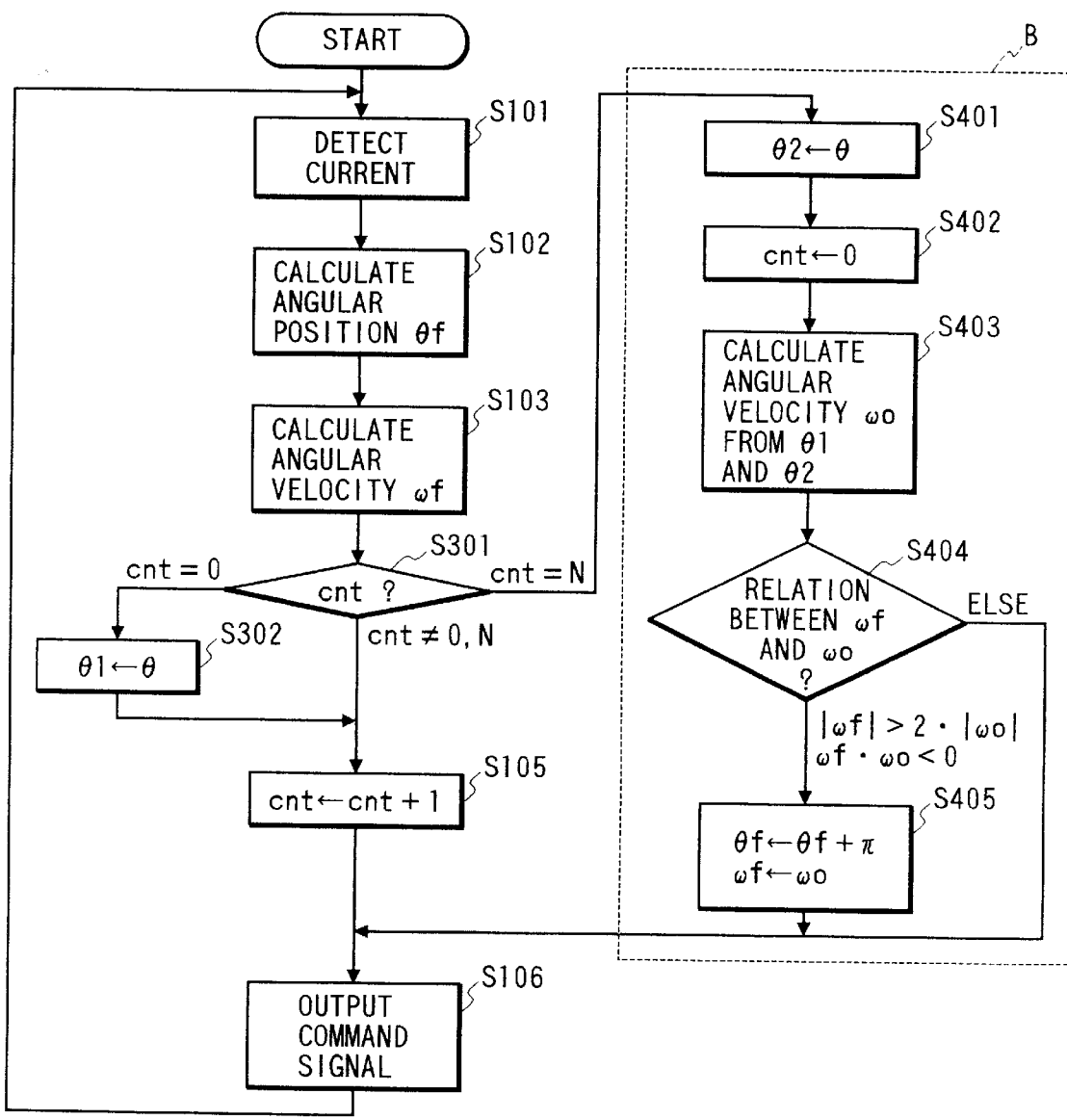
FIG. 20 is a flowchart of a program related to operation of the control unit in FIG. 19.

The control unit 101A operates in accordance with a program stored in its internal ROM. FIG. 20 is a flowchart of the program. The program in FIG. 20 is iteratively executed at a given period corresponding to a control period (equal to, for example, 100 μs).

With reference to FIG. 20, a first step S101 of the program detects phase currents iU and iW by referring to the output signals of the current sensors 107.

A step S102 following the step S101 calculates an angular position (a rotational angle) θf of the rotor in the motor 106 from the detected phase currents iU and iW.

A step S103 subsequent to the step S102 calculates an angular velocity ωf of the rotor in the motor 106 from the detected phase currents iU and iW.

A step S301 following the step S103 compares a count number "cnt" with "0" and a predetermined natural number N.

When the count number "cnt" is equal to "0", the program advances from the step S301 to a step S302. When the count number "cnt" is equal to neither "0" nor the predetermined natural number N, the program advances from the step S301 to a step S105. When the count number "cnt" is equal to the predetermined natural number N, the program advances from the step S301 to a polarity deciding routine "B". The count number "cnt" indicates a number of control periods. As will be made clear later, the count number "cnt" is reset to "0" for every N+1 control periods. The predetermined natural number N decides a frequency of the execution of the polarity decision (the polarity deciding routine "B") during operation of the motor 106.

The step S302 sets a variable θ1 to the angular position θf calculated by the step S102. As will be explained later, the angular position θ1 will be used by the polarity deciding routine "B". The angular position θ1 occurs in the first control period among N+1 control periods. After the step S302, the program advances to the step S105.

The step S105 increments the count number "cnt" by "1". After the step S105, the program advances to a step S106.

The polarity deciding routine "B" has steps 3401, S402, S403, S404, and S405. The step S401 which follows the step S301 sets a variable θ2 to the angular position θf calculated by the step S102. As will be explained later, the angular position θ2 will be used by the polarity deciding routine "B". The angular position θ2 occurs in the last control period among N+1 control periods. The step S402 which follows the step S401 resets the count number "cnt" to "0". The step S403 follows the step S402. The step S403 calculates an angular velocity ωo of the rotor in the motor 106 from the angular positions θ1 and θ2 and the predetermined natural number N by referring to the following equation.

$$\omega o = (\theta 2 - \theta 1)/(N \cdot \Delta t) \quad (17)$$

where Δt denotes the control period of time. In the equation (17), the term "N·Δt" corresponds to the time interval between the first control period and the last control period among N+1 control periods. Thus, the calculated angular velocity ωo is equal to a mean value over this time interval. In an exemplary case where the control period Δt of time is equal to 100 μs and the predetermined natural number N is equal to 50, the time interval "N·Δt" is equal to 5 ms.

In the polarity deciding routine "B", the step S404 which follows the step S403 decides the relation between the angular velocity ωo given by the step S403 and the angular velocity ωf calculated by the step S103. Specifically, the step S404 determines whether or not the angular velocities ωo and ωf satisfy at least one of the following conditions.

$$|\omega f| > A o \cdot |\omega o| \quad (18)$$

$$\omega f \cdot \omega o < 0 \quad (19)$$

where Ao denotes a predetermined constant value equal to, for example, 2. The predetermined constant value Ao may be different from 2. The determination by the step S404 corresponds to a determination as to whether or not the polarity of the magnetic field in the motor 106 is accurately recognized. When at least one of the conditions (18) and (19) is satisfied, that is, when the polarity of the magnetic field is erroneously recognized, the program advances from the step S404 to the step S405. When none of the conditions (18) and (19) is satisfied, that is, when the polarity of the magnetic field is accurately recognized, the program jumps from the step S404 to the step S106. The step S405 changes or updates the angular position θf to implement phase correction. Specifically, the step S405 increments the angular position θf by "π" according to a program statement as "θf=θf+π". In addition, the step S405 changes or updates the angular velocity ωf. Specifically, the step S405 sets the angular velocity ωf to the angular velocity ωo according to a program statement as "ωf=ωo". In this way, the step S405 can implement sign correction. After the step S405, the program advances to the step S106.

The step S106 calculates command phase voltages VU, VV, and VW from the angular position θf and the angular velocity ωf. Then, the step S106 generates energization signals in response to the command phase voltages VU, VV, and VW. Subsequently, the step S106 outputs the energization signals to the inverter 105. After the step S106, the program returns to the step S101.

As understood from the previous explanation, when the step S404 decides that none of the conditions (18) and (19) is satisfied, the step S405 is not executed so that the phase correction and the sign correction are avoided.

The step S105 increments the count number "cnt" by "1" for every control period of time. As previously explained, the step S301 compares the count number "cnt" with the predetermined natural number N. The step S301 enables the polarity deciding routine "B" to be executed once per N+1 control periods of time.

Figure 21:
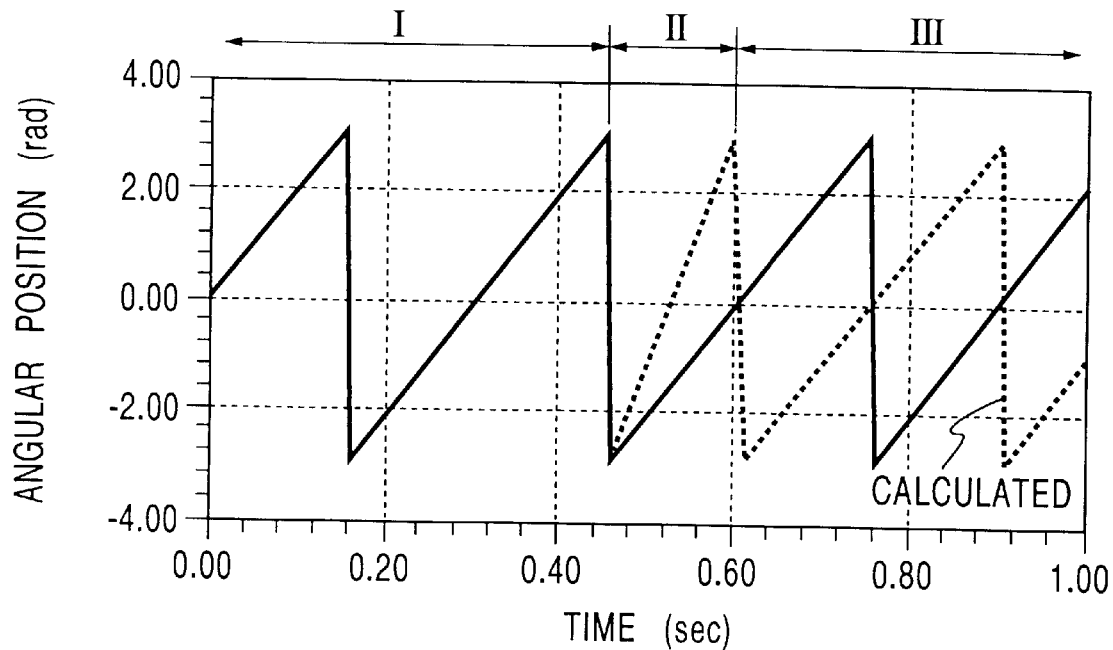
FIG. 21 is a time-domain diagram of angular positions (rotational angles) of the rotor in a permanent magnet synchronous motor.

FIG. 21 shows time-domain variations in an actual angular position and a calculated angular position θf which occur during simulation of drive of the motor 106 under condition changes from accurate polarity detection (accurate polarity decision) to wrong polarity detection (wrong polarity decision). With reference to FIG. 21, during a first time range I, the actual angular position and the calculated angular position θf are equal to each other, and hence the polarity of a magnetic field is accurately decided. During a second time range II following the first time range I, selection is given of wrong one of two different values of the angular position calculated according to the equation (10). Therefore, during the second time range II, the calculated angular position θf starts to deviate from the actual angular position. The error between the calculated angular position θf and the actual angular position continuously increases to a value of π. The continuous increase in the error is provided by the function of the variable LPF block 127 (see FIG. 16). During a third time range III following the second time range II, the calculated angular position θf remains different from the actual angular position by an error of π.

Figure 22:
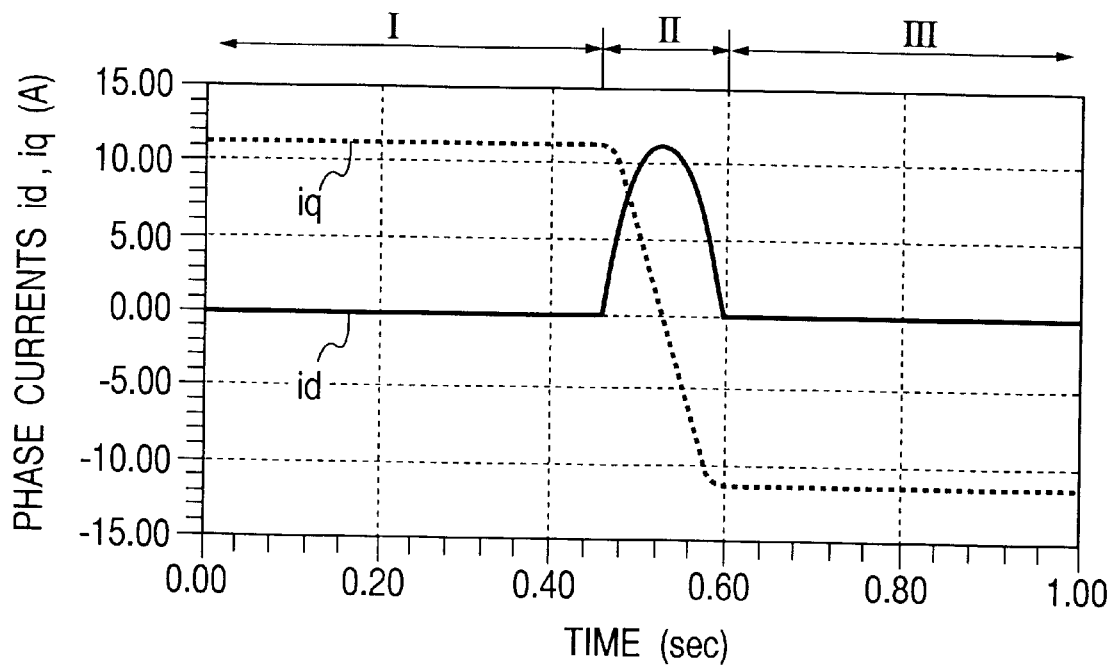
FIG. 22 is a time-domain diagram of calculated phase currents in a permanent magnet synchronous motor.

As previously explained, the phase currents iU and iW are detected by the current sensors 107. The phase currents id and iq are calculated from the detected phase currents iU and iW and the calculated angular position θf according to the equations (8), (9A), (9B), and (12). FIG. 22 shows time-domain variations in the calculated phase currents id and iq which occur during the simulation of drive of the motor 106 under the condition changes same as those in FIG. 21. With reference to FIG. 22, during the first time range I, the calculated phase current id remains "0" while the calculated phase current iq continues to be a positive value. During the second time range II, since the calculated angular position θf deviates from the actual angular position, the calculated phase current id changes from "0" along an inverted U-shaped curve and then returns to "0". On the other hand, the calculated phase current iq continue to vary in one direction. During the second time range II, the differential of the calculated phase current iq has large values. At a mid moment within the second time range II, the calculated phase current id takes an extreme value (a peak value) while the calculated phase current iq becomes "0". At this moment, the error between the calculated angular position θf and the actual angular position is equal to a value of π. During the third time range III, the calculated phase current id remains "0" while the calculated phase current iq continues to be a negative value. Thus, the sign of the calculated phase current iq during the third time range III is opposite to that during the first time range I.

Figure 23:
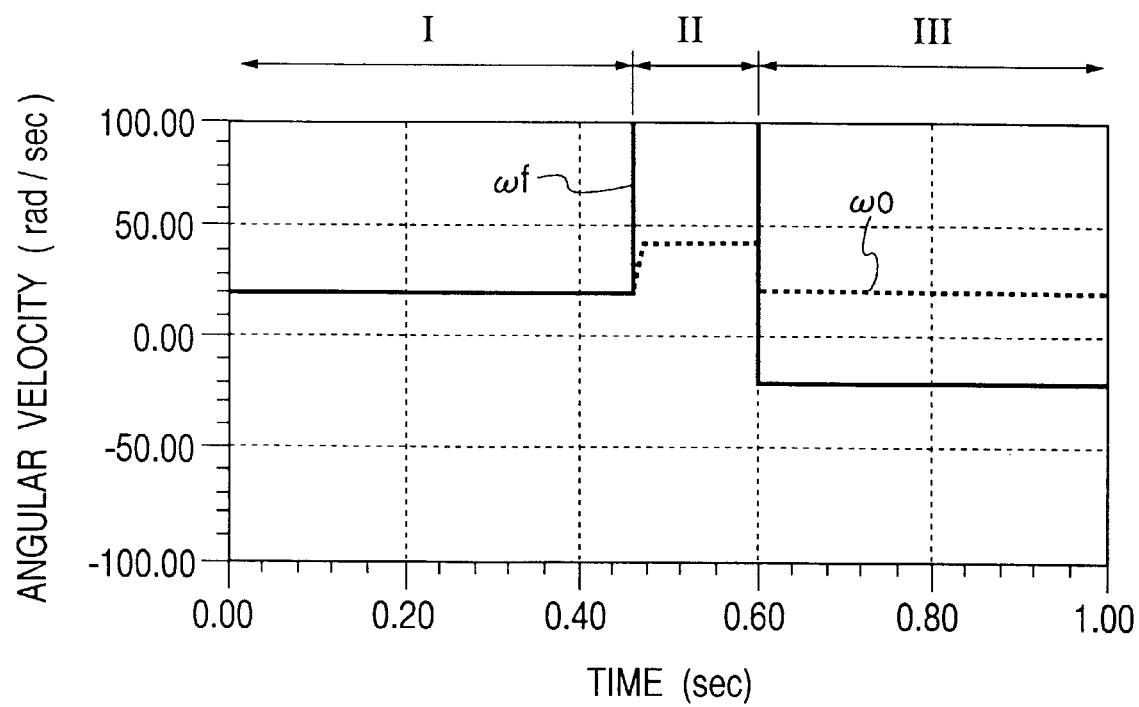
FIG. 23 is a time-domain diagram of angular velocities of the rotor in a permanent magnet synchronous motor.

FIG. 23 shows time-domain variations in the angular velocity ωo (calculated from the angular position θf and corresponding to an actual angular velocity) and the calculated angular velocity ωf which occur during the simulation of drive of the motor 106 under the condition changes same as those in FIGS. 21 and 22. As previously explained, the angular velocity ωf is calculated by referring to the equations (4) and (13). The angular velocity ωo is calculated by referring to the equation (17). With reference to FIG. 23, during the first time range I, the angular velocities ωo and ωf are equal to each other since the polarity of the magnetic field is accurately recognized. In this case, the calculated angular velocity ωf accurately corresponds to the actual angular velocity. During the second time range II, the calculated angular velocity ωf increases to a value equal to more than fifty times that available in the first time range I. This increase in the calculated angular velocity ωf is caused by an increase in the value of the term "piq" in the equation (4) during the deviation of the calculated angular position θf from the actual angular position. During the second time range II, the angular velocity ωo slightly deviates from the actual angular velocity since the difference between the calculated angular position θf and the actual angular position monotonically varies. The deviation of the angular velocity ωo from the actual angular velocity is remarkably smaller than the deviation of the calculated angular velocity ωf from the actual angular velocity. Thus, during the second time range II, the calculated angular velocity ωf is considerably greater than the angular velocity ωo so that the previously-indicated condition (18) is satisfied. Therefore, the recognition (detection) of the polarity of the magnetic field can be found to be wrong. In this case, the angular position θf and the angular velocity ωf can be corrected by the step S405 in FIG. 20. During the third time range III, the sign of the calculated angular velocity ωf is opposite to that in the first and second time range I and II. On the other hand, the sign of the angular velocity ωo remains equal to that in the first and second time ranges I and II. Thus, the sign of the angular velocity ωo is opposite to that of the calculated angular velocity ωf. Therefore, during the third time range III, the previously-indicated condition (19) is satisfied so that the recognition (detection) of the polarity of the magnetic field can be found to be wrong.

According to a modification of this embodiment, the step S405 in FIG. 20 does not implement the sign correction. In the modification of this embodiment, after the step S405 implements the phase correction, the step S103 is executed again. In this case, the step S103 changes the phase currents ix and iy into phase currents id and iq in response to the correction-resultant angular position θf by referring to the equation (12). Then, the step S103 calculates the angular velocity ω from the phase currents id and iq by referring to the equation (4). The sign of the calculated angular velocity ω is equal to that of an actual angular velocity.

It is preferable that at start of the motor 106, arbitrarily-selected one of two different values of the angular position calculated according to the equation (10) is used as an initial calculated angular position. In this case, the step S404 in FIG. 20 implements a decision as to whether or not the polarity of the magnetic filed is accurately recognized with respect to the initial calculated angular position. When the step S404 in FIG. 20 decides that the polarity of the magnetic filed is erroneously recognized, the calculated angular position and the calculated angular velocity are corrected by the step S405 in FIG. 20.

This embodiment may be applied to a decision about the polarity of the magnetic field in the case where the motor 106 starts to be effectively driven from conditions in which the motor 106 is rotating.

What is claimed is:

1. A method of position sensor-less control of a permanent magnet synchronous motor having multiple-phase armature windings and a rotor, the method comprising the steps of:

generating voltage command values;

generating phase voltages in response to the generated voltage command values;

applying the generated phase voltages to the armature windings;

detecting phase currents through the armature windings, the detected phase currents depending on the voltage command values;

calculating the angular position and an angular velocity of the rotor on the basis of the detected phase currents;

adjusting the voltage command values in response to the calculated angular position and the calculated angular velocity of the rotor to implement feedback control of the motor;

estimating an angular velocity of the rotor from a variation with respect to the lapse of time of the calculated angular position of the rotor;

determining whether or not the calculated angular velocity of the rotor and the estimated angular velocity of the rotor are substantially equal to each other; and changing the calculated angular position of the rotor by a predetermined phase value to correct the calculated angular position of the rotor when it is determined that the calculated angular velocity of the rotor and the estimated angular velocity of the rotor are not substantially equal to each other.

2. A method according to claim 1, wherein the determining step comprises:

detecting a first direction of rotation of the rotor from the calculated angular velocity of the rotor;

detecting a second direction of rotation of the rotor from the estimated angular velocity of the rotor;

deciding whether or not the first direction and the second direction are equal to each other;

determining that the calculated angular velocity of the rotor and the estimated angular velocity of the rotor are substantially equal to each other when the first direction and the second direction are equal to each other; and determining that the calculated angular velocity of the rotor and the estimated angular velocity of the rotor are not substantially equal to each other when the first direction and the second direction are not equal to each other.

3. A method according to claim 1, wherein the determining step comprises:

calculating a ratio between the calculated angular velocity of the rotor and the estimated angular velocity of the rotor;

deciding whether or not the calculated ratio exceeds a predetermined ratio;

determining that the calculated angular velocity of the rotor and the estimated angular velocity of the rotor are substantially equal to each other when the calculated ratio does not exceed the predetermined ratio; and determining that the calculated angular velocity of the rotor and the estimated angular velocity of the rotor are not substantially equal to each other when the calculated ratio exceeds the predetermined ratio.

4. A method according to claim 1, wherein the predetermined phase value is equal to $\pi$ radians.

5. A method according to claim 1, further comprising the step of inverting a sign of the calculated angular velocity of the rotor to correct the calculated angular velocity of the rotor when it is determined that the calculated angular velocity of the rotor and the estimated angular velocity of the rotor are not substantially equal to each other.

6. A method according to claim 1, further comprising the step of updating the calculated angular velocity of the rotor in response to the correction-resultant calculated angular position of the rotor when it is determined that the calculated angular velocity of the rotor and the estimated angular velocity of the rotor are not substantially equal to each other.

7. A method according to claim 1, further comprising the step of using the estimated angular velocity of the rotor instead of the calculated angular velocity of the rotor in adjusting the voltage command values when it is determined that the calculated angular velocity of the rotor and the estimated angular velocity of the rotor are not substantially equal to each other.

8. A method of position sensor-less control of a permanent magnet synchronous motor having multiple-phase armature windings and a rotor, the method comprising the steps of:

generating phase voltages;

applying the generated phase voltages to the armature windings;

detecting phase currents through the armature windings;

calculating an angular position and an angular velocity of the rotor on the basis of the detected phase currents;

adjusting the phase voltages in response to the calculated angular position and the calculated angular velocity of the rotor to implement feedback control of the motor;

estimating an angular velocity of the rotor from a variation with respect to the lapse of time of the calculated angular position of the rotor;

determining whether or not the calculated angular velocity of the rotor and the estimated angular velocity of the rotor are substantially equal to each other; and correcting the calculated angular position and the calculated angular velocity of the rotor when it is determined that the calculated angular velocity of the rotor and the estimated angular velocity of the rotor are not substantially equal to each other.

9. An apparatus for position sensor-less control of a permanent magnet synchronous motor having multiple-phase armature windings and a rotor, the apparatus comprising:

means for generating voltage command values;

means for generating phase voltages in response to the generated voltage command values;

means for applying the generated phase voltages to the armature windings;

means for detecting phase currents through the armature windings, the detected phase currents depending on the voltage values;

means for calculating an angular position and an angular velocity of the rotor on the basis of the detected phase currents;

means for adjusting the voltage command values in response to the calculated angular position and the calculated angular velocity of the rotor to implement feedback control of the motor;

means for estimating an angular velocity of the rotor from a variation with respect to the lapse of time of the calculated angular position of the rotor;

means for determining whether or not the calculated angular velocity of the rotor and the estimated angular velocity of the rotor are substantially equal to each other; and means for changing the calculated angular position of the rotor by a predetermined phase value to correct the calculated angular position of the rotor when it is determined that the calculated angular velocity of the rotor and the estimated angular velocity of the rotor are not substantially equal to each other.

10. An apparatus according to claim 9, wherein the determining means comprises:

means for detecting a first direction of rotation of the rotor from the calculated angular velocity of the rotor;

means for detecting a second direction of rotation of the rotor from the estimated angular velocity of the rotor;

means for deciding whether or not the first direction and the second direction are equal to each other;

means for determining that the calculated angular velocity of the rotor and the estimated angular velocity of the rotor are substantially equal to each other when the first direction and the second direction are equal to each other; and means for determining that the calculated angular velocity of the rotor and the estimated angular velocity of the rotor are not substantially equal to each other when the first direction and the second direction are not equal to each other.

11. An apparatus according to claim 9, wherein the determining means comprises:
- means for calculating a ratio between the calculated angular velocity of the rotor and the estimated angular velocity of the rotor;
- means for deciding whether or not the calculated ratio exceeds a predetermined ratio;
- means for determining that the calculated angular velocity of the rotor and the estimated angular velocity of the rotor are substantially equal to each other when the calculated ratio does not exceed the predetermined ratio; and
- means for determining that the calculated angular velocity of the rotor and the estimated angular velocity of the rotor are not substantially equal to each other when the calculated ratio exceeds the predetermined ratio.

12. An apparatus according to claim 9, wherein the predetermined phase value is equal to $\pi$ radians.

13. An apparatus according to claim 9, further comprising means for inverting a sign of the calculated angular velocity of the rotor to correct the calculated angular velocity of the rotor when it is determined that the calculated angular velocity of the rotor and the estimated angular velocity of the rotor are not substantially equal to each other.

14. An apparatus according to claim 9, further comprising means for updating the calculated angular velocity of the rotor in response to the correction-resultant calculated angular position of the rotor when it is determined that the calculated angular velocity of the rotor and the estimated angular velocity of the rotor are not substantially equal to each other.

15. An apparatus according to claim 9, further comprising means for using the estimated angular velocity of the rotor instead of the calculated angular velocity of the rotor in adjusting the voltage command values when it is determined that the calculated angular velocity of the rotor and the estimated angular velocity of the rotor are not substantially equal to each other.

16. An apparatus for position sensor-less control of a permanent magnet synchronous motor having multiple-phase armature windings and a rotor, the apparatus comprising:
- means for generating phase voltages;
- means for applying the generated phase voltages to the armature windings;
- means for detecting phase currents through the armature windings;
- means for calculating an angular position and an angular velocity of the rotor on the basis of the detected phase currents;
- means for adjusting the phase voltages in response to the calculated angular position and the calculated angular velocity of the rotor to implement feedback control of the motor;
- means for estimating an angular velocity of the rotor from a variation with respect to the lapse of time of the calculated angular position of the rotor;
- means for determining whether or not the calculated angular velocity of the rotor and the estimated angular velocity of the rotor are substantially equal to each other; and
- means for correcting the calculated angular position and the calculated angular velocity of the rotor when it is determined that the calculated angular velocity of the rotor and the estimated angular velocity of the rotor are not substantially equal to each other.

* * * * *